US012766989B2

(12) United States Patent
Kim et al.

(10) Patent No.: US 12,766,989 B2
(45) Date of Patent: Oct. 20, 2026

(54) VEHICLE CONTROL APPARATUS AND METHOD

(71) Applicants: HYUNDAI MOTOR COMPANY, Seoul (KR); KIA CORPORATION, Seoul (KR)

(72) Inventors: Ju Seok Kim, Hwaseong-si (KR); Yo Han Baek, Hwaseong-si (KR); Yoo Hong Jang, Hwaseong-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 36 days.

(21) Appl. No.: 18/933,271

(22) Filed: Oct. 31, 2024

(65) Prior Publication Data

US 2025/0346139 A1 Nov. 13, 2025

(30) Foreign Application Priority Data

May 9, 2024 (KR) ........................ 10-2024-0061276

(51) Int. Cl.
*B60L 53/60* (2019.01)
*B60L 53/65* (2019.01)
*B60L 58/12* (2019.01)

(52) U.S. Cl.
CPC ............... *B60L 53/60* (2019.02); *B60L 53/65* (2019.02); *B60L 58/12* (2019.02); *B60L 2250/16* (2013.01)

(58) Field of Classification Search
CPC .......... B60L 53/60; B60L 53/62; B60L 53/65; B60L 53/68; B60L 58/12; B60L 58/13;
(Continued)

(56) References Cited

U.S. PATENT DOCUMENTS

2015/0360578 A1* 12/2015 Duan .................... B60W 50/14 340/455
2017/0106760 A1* 4/2017 Wang ...................... B60L 53/00
(Continued)

FOREIGN PATENT DOCUMENTS

CN 121734179 A * 3/2026
EP 4361356 A1 5/2024
(Continued)

OTHER PUBLICATIONS

Liu, et al., "State of Energy Estimation of Electric Vehicle Based on GRU-RNN," 2022 37th Youth Academic Annual Conference of Chinese Association of Automation (YAC), Beijing, China, 2022, pp. 115-120, doi: 10.1109/YAC57282.2022.10023893 (https://ieeexplore.ieee.org/document/10023893?source=IQplus) (Year: 2022).*
(Continued)

*Primary Examiner* — Atul Trivedi
(74) *Attorney, Agent, or Firm* — Lempia Summerfield Katz LLC

(57) ABSTRACT

A vehicle control apparatus includes a processor and a memory. The processor monitors at least one of battery energy information or charging information of a vehicle. The processor determines whether to generate at least one of first pattern information for setting a charging range of a battery of the vehicle or second pattern information for adjusting a charge current using a charging time taken to charge the battery. The processor identifies an input indicating consent to updating the at least one of the first pattern information or the second pattern information, which is generated based on determination to generate the at least one of the first pattern information or the second pattern information, in charging profile information. The processor updates the charging profile information, using the gener-
(Continued)

ated at least one of the first pattern information or the second pattern information.

20 Claims, 15 Drawing Sheets

(58) Field of Classification Search
CPC ................. B60L 58/16; B60L 2240/54; B60L 2240/547; B60L 2240/549; B60L 2250/12; B60L 2250/16; B60Y 2200/91; H02J 7/82; H02J 7/84; H02J 7/92; Y02T 10/70; Y02T 90/12
USPC ............................................................ 701/22
See application file for complete search history.

(56) References Cited

U.S. PATENT DOCUMENTS

| | | | | |
|---|---|---|---|---|
| 2017/0242079 | A1* | 8/2017 | Duan | B60L 50/15 |
| 2019/0176632 | A1* | 6/2019 | Treharne | B60L 58/12 |
| 2023/0034264 | A1* | 2/2023 | Yeo | B60L 58/16 |
| 2023/0182606 | A1* | 6/2023 | Matsushita | B60L 53/126 320/109 |
| 2023/0182610 | A1* | 6/2023 | Matsushita | B60L 53/12 700/297 |
| 2023/0311699 | A1 | 10/2023 | Saita | |
| 2023/0406143 | A1* | 12/2023 | Dow | B60L 53/12 |
| 2023/0406144 | A1* | 12/2023 | Dow | B60L 53/12 |
| 2023/0408273 | A1* | 12/2023 | Dow | B60L 53/12 |
| 2024/0083265 | A1 | 3/2024 | Takaki | |
| 2024/0088693 | A1* | 3/2024 | Riemer | H02J 7/42 |
| 2024/0092221 | A1* | 3/2024 | Spigno, Jr. | B60L 53/66 |
| 2024/0140257 | A1* | 5/2024 | Ropel | H01M 10/482 |
| 2024/0140260 | A1* | 5/2024 | Ropel | B60L 58/12 |
| 2024/0140261 | A1* | 5/2024 | Ropel | B60L 58/12 |
| 2024/0140262 | A1* | 5/2024 | Ropel | B60L 58/12 |
| 2024/0140263 | A1* | 5/2024 | Ropel | B60L 3/0046 |
| 2024/0142534 | A1* | 5/2024 | Ropel | B60L 3/12 |
| 2024/0144747 | A1* | 5/2024 | Ropel | B60L 3/12 |
| 2024/0154414 | A1* | 5/2024 | Wright | G06Q 50/06 |
| 2024/0157836 | A1* | 5/2024 | Galbraith | B60L 53/68 |
| 2024/0192282 | A1* | 6/2024 | Hiratsuka | G01R 31/392 |
| 2024/0388111 | A1* | 11/2024 | Yebka | H02J 7/84 |
| 2024/0429728 | A1* | 12/2024 | Abbott | H01M 10/425 |
| 2025/0167331 | A1* | 5/2025 | Hashimoto | B60L 7/24 |
| 2025/0175027 | A1* | 5/2025 | Imai | B60L 58/26 |
| 2025/0293536 | A1* | 9/2025 | Rimstidt | G01R 31/367 |
| 2025/0388108 | A1* | 12/2025 | Duan | B60L 53/62 |
| 2026/0084571 | A1* | 3/2026 | Baek | B60L 53/66 |

FOREIGN PATENT DOCUMENTS

| | | | | | |
|---|---|---|---|---|---|
| EP | 4053573 | B1 | * | 12/2025 | H02J 7/963 |
| GB | 2627746 | A | * | 9/2024 | B60L 58/12 |
| JP | 2013051809 | A | | 3/2013 | |
| JP | 2014045567 | A | * | 3/2014 | |
| JP | 2015177601 | A | | 10/2015 | |
| JP | 2018074812 | A | * | 5/2018 | |
| KR | 20190126627 | A | | 11/2019 | |
| KR | 102113305 | B1 | | 5/2020 | |
| KR | 20230018904 | A | | 2/2023 | |
| KR | 20230072265 | A | | 5/2023 | |
| WO | WO-2024078727 | A1 | * | 4/2024 | B60L 53/62 |
| WO | WO-2024078728 | A1 | * | 4/2024 | H02J 7/92 |
| WO | WO-2025242269 | A1 | * | 11/2025 | H02J 7/96 |
| WO | WO-2026015406 | A1 | * | 1/2026 | H02J 7/977 |

OTHER PUBLICATIONS

Liu, et al., "State of Energy Estimation of Electric Vehicle Based on GRU-RNN," 2022 37th Youth Academic Annual Conference of Chinese Association of Automation (YAC), Beijing, China, 2022, pp. 115-120, doi: 10.1109/YAC57282.2022.10023893 (https://ieeexplore.ieee.org/document/10023893) (Year: 2022).*
European Search Report cited in the European patent application No. 24217014.0; May 26, 2025; 9 pp.

* cited by examiner

VEHICLE CONTROL APPARATUS AND METHOD

CROSS-REFERENCE TO RELATED APPLICATION

This application claims the benefit of and priority to Korean Patent Application No. 10-2024-0061276, filed in the Korean Intellectual Property Office on May 9, 2024, the entire contents of which are incorporated herein by reference.

TECHNICAL FIELD

The present disclosure relates to a vehicle control apparatus and a method thereof and more particularly relates to technologies for updating charging profile information.

BACKGROUND

A technology for a vehicle, which drives its motor using electric energy stored in its battery to produce power, has been studied. Because the vehicle is controlled using the battery, suitably managing the battery and maintaining the state of the battery as an optimal state may be a very important factor in improving the performance of the vehicle. To maintain the state of the battery as the optimal state and preventing the life of the battery from being reduced, there is a need to consider various factors, such as a charging pattern of the battery, which affects the performance of the battery, or an environment (e.g., an outside air temperature) in which the battery is used. There may be a need for a service for providing the performance of the battery, which will be additionally improved, by changing the charging pattern, which affects the performance of the battery. The subject matter described in this background section is intended to promote an understanding of the background of the disclosure and thus may include subject matter that is not already known to those of ordinary skill in the art.

SUMMARY

The present disclosure has been made to solve the above-mentioned problems occurring in the prior art while advantages achieved by the prior art are maintained intact.

An aspect of the present disclosure provides a vehicle control apparatus for setting a charging range of a battery and a method thereof.

Another aspect of the present disclosure provides a vehicle control apparatus for adjusting a charge current for charging a battery and provides a method thereof.

Another aspect of the present disclosure provides a vehicle control apparatus for identifying whether to update charging profile information based on an owner of a battery and provides a method thereof.

The technical problems to be solved by the present disclosure are not limited to the aforementioned problems. However, any other technical problems not mentioned herein should be clearly understood from the following description by those having ordinary skill in the art to which the present disclosure pertains.

According to an aspect of the present disclosure processor, a vehicle control apparatus may include a processor and a memory. The processor may be configured to monitor at least one of battery energy information or charging information of a vehicle. The processor may be configured to determine whether to generate at least one of first pattern information for setting a charging range of a battery of the vehicle or second pattern information for adjusting a charge current using a charging time taken to charge the battery, by monitoring the at least one of the battery energy information or the charging information. The processor may be configured to identify an input indicating consent to updating the at least one of the first pattern information or the second pattern information. The at least one of the first pattern information or the second pattern information is generated based on determination to generate the at least one of the first pattern information or the second pattern information, in charging profile information. The processor may be configured to update the charging profile information, using the generated at least one of the first pattern information or the second pattern information, in response to the identified input.

In an embodiment, the processor may be configured to identify minimum remaining energy of the battery and discharge energy of the battery, using the battery energy information. The processor may be configured to set the charging range including an upper limit state of charge (SOC) in which an SOC usage range corresponding to the discharge energy of the battery is added from a lower limit SOC corresponding to the minimum remaining energy of the battery, using the minimum remaining energy and the discharge energy. The processor may be configured to charge the battery to the upper limit SOC, during the charging time, when the battery is charged based on the charging profile information updated based on the first pattern information indicating the charging range.

In an embodiment, the processor may be configured to determine a threshold current, such that a connection time when the battery is connected to a charging connector to charge the battery and the charging time match with each other, based on a relationship among rated energy of the battery. The rated energy is identified using the charging information, the connection time, and a current SOC of the battery. The processor may be configured to charge the battery during the connection time by the charge current. The charge current is less than or equal to the threshold current, when the battery is charged based on the charging profile information. The charging profile information is updated based on the second pattern information indicating the determined threshold current.

In an embodiment, the processor may be configured to identify an upper limit SOC, based on minimum remaining energy and discharge energy identified using the battery energy information, when the battery is charged based on the charging profile information. The charging profile information is updated based on the first pattern information and the second pattern information. The processor may be configured to charge the battery to the upper limit SOC, during a connection time when the battery is connected to a charging connector to charge the battery, by the charge current. The charge current is less than or equal to a threshold current determined based on a relationship among rated energy of the battery, the connection time, and a current SOC.

In an embodiment, the vehicle control apparatus may further include a display. The processor may be configured to display a visual object indicating an update of the charging profile information on the display to update the charging profile information, when the processor and the memory are included in the vehicle. The processor may be configured to receive the input indicating the consent to the update, using the visual object. The processor may be configured to initiate the update, in response to the input.

In an embodiment, the processor may be configured to identify information of an owner who owns the battery. The processor may be configured to, without displaying the visual object, initiate the update, when the owner who owns the battery is a corporate body. The processor may be configured to initiate to display the visual object, when the owner who owns the battery is an individual.

In an embodiment, the processor may be configured to generate the first pattern information, when a difference between rated energy of the battery and discharge energy of the battery is greater than or equal to threshold energy.

In an embodiment, the processor may be configured to generate the second pattern information, when a ratio between a connection time between the battery and a charging connector and the charging time is greater than or equal to a threshold ratio.

In an embodiment, the processor may be configured to provide a state of health (SOH) indicating remaining life of the battery, the remaining life to increase, by updating the charging profile information using the at least one of the first pattern information or the second pattern information.

In an embodiment, the processor may be configured to transmit a first signal including at least one of rated energy of the battery, discharge energy of the battery, remaining energy of the battery, minimum remaining energy of the battery, or any combination thereof to an external electronic device, when the processor and the memory are included in the vehicle. The processor may be configured to obtain the first pattern information from the external electronic device. The processor may be configured to transmit a second signal including a connection time between the battery and a charging connector and the charging time to the external electronic device. The processor may be configured to obtain the second pattern information from the external electronic device.

In an embodiment, the processor may be configured to receive at least one of the battery energy information or the charging information corresponding to each of a plurality of vehicles including the vehicle from the plurality of vehicles, when the processor and the memory are included outside the vehicle. The processor may be configured to generate at least one of the first pattern information or the second pattern information corresponding to the vehicle among the plurality of vehicles, by monitoring the received at least one of the battery energy information or the charging information.

According to another aspect of the present disclosure, a method performed by a vehicle control apparatus may include monitoring at least one of battery energy information or charging information of a vehicle. The method may include determining whether to generate at least one of first pattern information for setting a charging range of a battery of the vehicle or second pattern information for adjusting a charge current using a charging time taken to charge the battery, by monitoring the at least one of the battery energy information or the charging information. The method may include identifying an input indicating consent to updating the at least one of the first pattern information or the second pattern information. The at least one of the first pattern information or the second pattern information is generated based on determination to generate the at least one of the first pattern information or the second pattern information, in charging profile information. The method may include updating the charging profile information, using the generated at least one of the first pattern information or the second pattern information, in response to the identified input.

In an embodiment, updating the charging profile information may include identifying minimum remaining energy of the battery and discharge energy of the battery, using the battery energy information. Updating the charging profile information may include setting a charging range including an upper limit state of charge (SOC) in which an SOC usage range corresponding to the discharge energy of the battery is added from a lower limit SOC corresponding to the minimum remaining energy of the battery, using the minimum remaining energy and the discharge energy. Updating the charging profile information may include charging the battery to the upper limit SOC, during the charging time, when charging the battery is charged based on the charging profile information updated based on the first pattern information indicating the charging range.

In an embodiment, updating the charging profile information may include determining a threshold current, such that a connection time when the battery is connected to a charging connector to charge the battery and the charging time match with each other, based on a relationship among rated energy of the battery. The rated energy is identified using the charging information, the connection time, and a current SOC of the battery. Updating the charging profile information may include charging the battery during the connection time by the charge current which is less than or equal to the threshold current, when the battery is charged based on the charging profile information. The charging profile information is updated based on the second pattern information indicating the determined threshold current.

In an embodiment, updating the charging profile information may include identifying an upper limit SOC, based on minimum remaining energy and discharge energy identified using the battery energy information, when the battery is charged based on the charging profile information. The charging profile information is updated based on the first pattern information and the second pattern information. Updating the charging profile information may include charging the battery to the upper limit SOC, during a connection time when the battery is connected to a charging connector to charge the battery, by the charge current. The charge current is less than or equal to a threshold current determined based on a relationship among rated energy of the battery, the connection time, and a current SOC.

In an embodiment, identifying the input may include displaying a visual object indicating an update of the charging profile information on a display to update the charging profile information. Identifying the input may include receiving the input indicating the consent to the update, using the visual object.

In an embodiment, displaying the visual object may include identifying information of an owner who owns the battery. Displaying the visual object may include, without displaying the visual object, initiating the update, when the owner who owns the battery is a corporate body. Displaying the visual object may include initiating to display the visual object, when the owner who owns the battery is an individual.

In an embodiment, determining whether to generate the at least one of the first pattern information or the second pattern information may include generating the first pattern information, when a difference between rated energy of the battery and discharge energy of the battery is greater than or equal to threshold energy.

In an embodiment, determining whether to generate the at least one of the first pattern information or the second pattern information may include generating the second pattern information, when a ratio between a connection time between the battery and a charging connector and the charging time is greater than or equal to a threshold ratio.

In an embodiment, updating the charging profile information may include providing a state of health (SOH) indicating remaining life of the battery, the remaining life to increase, by updating the charging profile information using the at least one of the first pattern information or the second pattern information.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Figure 1:
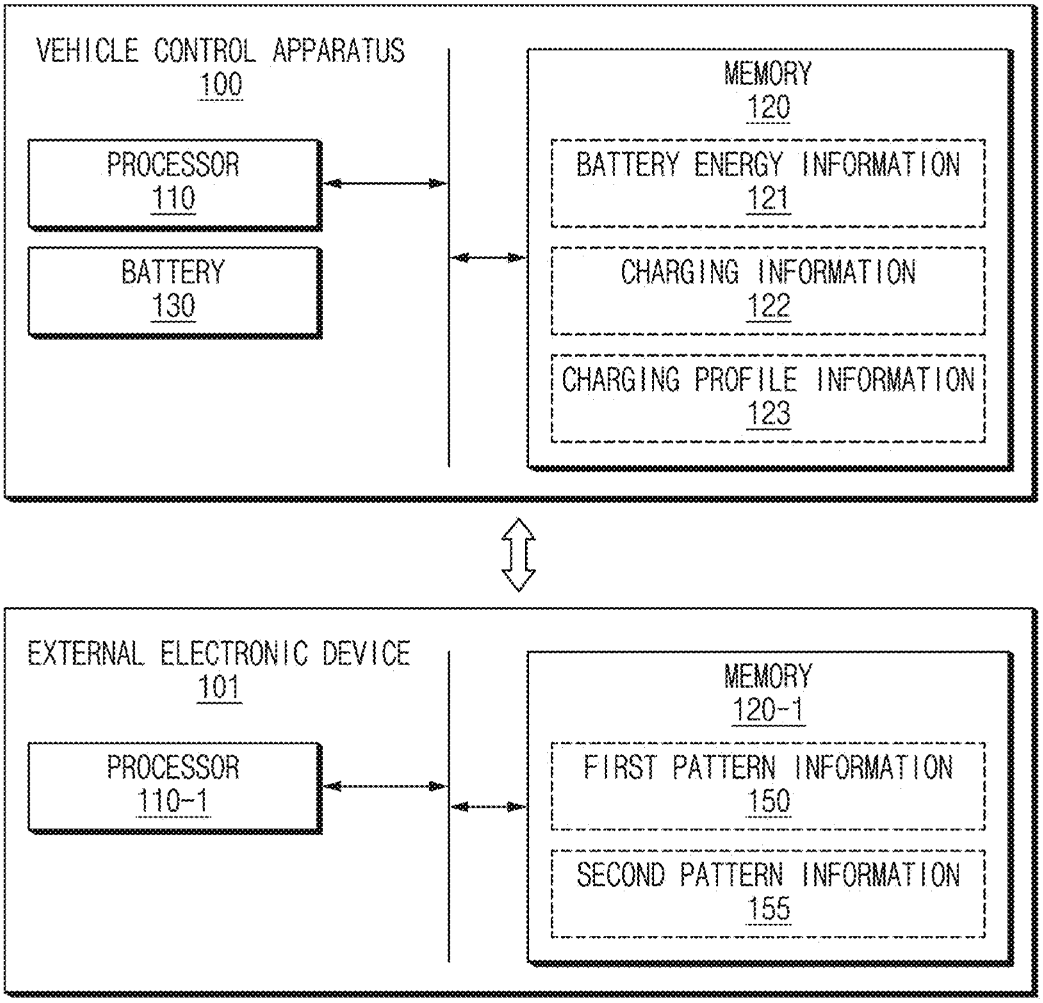
FIG. 1 illustrates an example of a block diagram associated with a vehicle control apparatus according to an embodiment of the present disclosure.

Hereinafter, some embodiments of the present disclosure are described in detail with reference to the drawings. In adding the reference numerals to the components of each drawing, it should be noted that identical and equivalent components are designated by the identical numerals even when the components are displayed on other drawings. In addition, a detailed description of well-known features or functions has been omitted in order not to unnecessarily obscure the gist of the present disclosure.

In describing components of embodiments of the present disclosure, the terms first, second, A, B, (a), (b), and the like may be used herein. These terms are only used to distinguish one component from another component but do not limit the corresponding components irrespective of the order or priority of the corresponding components. Furthermore, unless otherwise defined, all terms including technical and scientific terms used herein have the same meaning as being generally understood by those having ordinary skill in the art to which the present disclosure pertains. Such terms as those defined in a generally used dictionary should be interpreted as having meanings equal to the contextual meanings in the relevant field of art. Such terms should not be interpreted as having ideal or excessively formal meanings unless clearly defined as having such in the present disclosure.

The term "module" used in various embodiments of the present disclosure may include a unit implemented with hardware, software, or firmware and may be interchangeably used with terms, for example, "logic," "logic block," "part," or "circuitry". A module may be an integral part of a minimum unit or portion thereof configured to perform one or more functions. In an embodiment, the module may be implemented in the form of an application-specific integrated circuit (ASIC). According to various embodiments, operations performed by the module, the program, or another component may be carried out sequentially, in parallel, or repeatedly. Alternatively, one or more of the operations may be executed in a different order or omitted. Alternatively, one or more other operations may be added. When a controller, module, component, device, element, or the like of the present disclosure is described as having a purpose or performing an operation, function, or the like, the controller, module, component, device, element, or the like should be considered herein as being "configured to" meet that purpose or to perform that operation or function. Each controller, module, component, device, element, and the like may separately embody or be included with a processor and a memory, such as a non-transitory computer readable media, as part of the apparatus.

Various embodiments of the present disclosure may be implemented as software (e.g., a program) including one or more instructions stored in a storage medium (e.g., an internal memory or an external memory) readable by a machine (e.g., a vehicle control apparatus 100). For example, a processor (e.g., a processor 110) of the device (e.g., the vehicle control apparatus 100) may invoke at least one of the stored one or more instructions from the storage medium and may execute the one or more instructions. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" simply means that the storage medium is a tangible device and does not include a signal (e.g., an electromagnetic wave). However, this term does not differentiate between where data is semipermanently stored in the storage medium and where data is temporarily stored in the storage medium.

Hereinafter, embodiments of the present disclosure are described in detail with reference to FIGS. 1-14.

FIG. 1 illustrates an example of a block diagram associated with a vehicle control apparatus according to an embodiment of the present disclosure.

Referring to FIG. 1, a vehicle control apparatus 100 according to an embodiment of the present disclosure may be implemented inside or outside a vehicle, and some of the components included in the vehicle control apparatus 100 may be implemented inside or outside the vehicle. In this case, the vehicle control apparatus 100 may be integrally configured with control units in the vehicle or may be implemented as a separate device to be connected to the control units of the vehicle by a separate connection means. For example, the vehicle control apparatus 100 may further include components, which are not shown in FIG. 1. For example, the vehicle control apparatus 100 may include a display for displaying at least one screen. For example, the vehicle control apparatus 100 may include an interface for charging a battery.

The vehicle control apparatus 100 according to an embodiment may include at least one of a processor 110, a memory 120, or a battery 130. The processor 110, the memory 120, and the battery 130 may be electronically or operably coupled each other by an electronical component including a communication bus. Hereinafter, the pieces of hardware are operably coupled to each other may mean that a direct connection or an indirect connection between the pieces of hardware is established in a wired or wireless manner, such that second hardware is controlled by first hardware among the pieces of hardware. The pieces of hardware are illustrated based on the different blocks, but an embodiment is not limited thereto. Some of the pieces of hardware of FIG. 1 (e.g., at least some of the processor 110, the memory 120, or a communication circuit (not shown)) may be included in a single integrated circuit such as a system on a chip (SoC).

The processor 110 of the vehicle control apparatus 100 according to an embodiment may include a hardware component for processing data based on one or more instructions. The hardware for processing the data may include, for example, an arithmetic and logic unit (ALU), a floating point unit (FPU), a field programmable gate array (FPGA), a central processing unit (CPU), and/or an application processor (AP). The number of the processors 110 may be one or more in number. For example, the processor 110 may have a structure of a multi-core processor including a dual core, a quad core, a hexa core, or an octa core.

The memory 120 of the vehicle control apparatus 100 may include a hardware component for storing data and/or instructions input and/or output from the processor 110. The memory 120 may include, for example, a volatile memory, such as a random-access memory (RAM), and/or a non-volatile memory, such as a read-only memory (ROM). For example, the volatile memory may include at least one of a dynamic RAM (DRAM), a static RAM (SRAM), a cache RAM, or a pseudo SRAM (PSRAM). For example, the non-volatile memory may include at least one of a programmable ROM (PROM), an erasable PROM (EPROM), an electrically erasable PROM (EEPROM), a flash memory, a hard disk, a compact disc, or an embedded multi-media card (eMMC).

The battery 130 of the vehicle control apparatus 100 according to an embodiment may include a battery cell, a battery module, or a battery pack. For example, the battery 130 may be composed of one or more unit cells. The battery 130 may include a capacitor or a secondary battery, which stores power depending on charging. For example, the battery 130 may include any one of a lithium (Li)-ion battery, a Li-ion polymer battery, a lead-acid battery, a nickel-cadmium (NiCd) battery, or a nickel-metal hydride (NiMH) battery. The battery 130 may supply electricity to a motor in an electric vehicle (EV) mode and a hybrid electric vehicle (HEV) mode and may be charged by means of electricity collected by means of the motor in a regenerative braking mode.

One or more instructions indicating calculation and/or an operation to be performed for data by the processor 110 of the vehicle control apparatus 100 may be stored in the memory 120 of the vehicle control apparatus 100 according to an embodiment. A set of the one or more instructions may be referred to as firmware, an operating system, a process, a routine, a sub-routine, and/or an application. For example, if a set of a plurality of instructions distributed in the form of an operating system, firmware, a driver, and/or an application is executed, the vehicle control apparatus 100 and/or the processor 110 may perform at least one of the operations of FIGS. 4-7B, 10, and 13.

Battery energy information 121, charging information 122, and/or charging profile information 123 (or charging pattern information) may be stored in the memory 120 of the vehicle control apparatus 100 according to embodiment.

In an embodiment, the battery energy information 121 may indicate a usage transition of the battery 130 over time. The battery energy information 121 may include energy information associated with the battery 130, which indicates a usage transition of the battery 130 over time, voltage information associated with the battery 130, current information associated with the battery 130, and/or battery energy information associated with the battery 130. The battery energy information 121 is described in detail below with reference to FIGS. 2 and 3.

In an embodiment, the charging information 122 may include a connection time when an interface for charging the battery 130 and a charging connector are connected to each other, and/or the charging information 122 may include a charging time taken to charge the battery 130 using a charge current received via the charging connector.

In an embodiment, the charging profile information 123 may be used to charge the battery 130 during the charging time. The charging profile information 123 may indicate a charging pattern for charging the battery 130. The charging pattern may include a constant current stage, a constant voltage stage, and/or a trickle charge stage or a float charge stage.

For example, the constant current stage may indicate a stage for charging the battery 130 based on a relatively low voltage, in an initial stage for charging the battery 130. The constant voltage stage may indicate a stage for reducing a charge current transmitted to the battery 130 to keep the voltage of the battery 130 constant, if the voltage of the battery 130 reaches a specific voltage. The trickle charge stage or the float charge stage may indicate a stage for maintaining the charge current transmitted to the battery 130 to be relatively low to prevent the battery 130 from being overcharged. For example, the vehicle control apparatus 100 may adjust the charge current transmitted to the battery 130 and/or the charging time for charging the battery 130, based on the charging profile information 123 and thus may charge the battery 130.

For example, the battery energy information 121 and the charging information 122 may be represented as Table 1 below.

TABLE 1

| | |
|---|---|
| Battery capacity | 100 (kwh) |
| Connection time | 1 (hour) |
| Charging completion time | 1 (hour) |
| Charging start state of charge (SOC) | 50 (%) |
| Maximum charging SOC | 100 (%) |
| Minimum SOC | 10 (%) |
| Discharge energy (or SOC usage range) | 50 (kwh) (use 50%) |
| Charging speed | 0.55 (C) |
| Maximum SOC | 60 (%) |
| Charging range | 10~60 (%) |

Table 1 above may include information about a vehicle associated with the vehicle control apparatus 100.

Referring to Table 1 above, the battery energy information 121 may include a battery capacity, a charging start state of charge (SOC), a maximum SOC (or an upper limit SOC), a minimum SOC (or a lower limit SOC), and/or discharge energy. The vehicle control apparatus 100 may obtain second pattern information 155 including the maximum SOC and/or a charging range, using the battery energy information 121.

Referring to Table 1 above, the charging information 122 may include a connection time and/or a charging completion time. The vehicle control apparatus 100 may obtain first pattern information 150 including a charging speed (or a threshold current), using the charging information 122.

In an embodiment, an external electronic device 101 may include at least one of a processor 110-1 or a memory 120-1. The processor 110-1 and the memory 120-1 may be electronically or operably coupled to each other by an electronical component, such as a communication bus. Types of the pieces of hardware included in the external electronic device 101 and/or the number of the pieces of hardware are/is not limited to those shown in FIG. 1. For example, the external electronic device 101 may include only some of the pieces of hardware shown in FIG. 1. The processor 110-1 and the memory 120-1 included in the external electronic device 101 may include a hardware part and/or a circuit corresponding to the processor 110 and the memory 120 of the vehicle control apparatus 100. Hereinafter, to reduce the repetition, the description of hardware and/or software included in the external electronic device 101 may be omitted when the hardware and/or the software are/is identical to the vehicle control apparatus 100.

In an embodiment, the external electronic device 101 may obtain the battery energy information 121 and/or the charging information 122 from the vehicle control apparatus 100. The vehicle control apparatus 100 may transmit a signal including the battery energy information 121 and/or the charging information 122 to the external electronic device 101. For example, the vehicle control apparatus 100 may transmit a first signal including at least one of rated energy of the battery 130, discharge energy of the battery 130, remaining energy of the battery 130, minimum remaining energy of the battery 130, or any combination thereof to the external electronic device 101. For example, the vehicle control apparatus 100 may transmit a second signal including the connection time and the charging time to the external electronic device 101. For example, the energy (or capacity) of the battery 130 may be represented as a percentage based on a ratio between the energy (or capacity) of the battery and the rated energy (or rated capacity). The energy of the battery 130, which is represented as the percentage, may indicate a state of charge (SOC) of the battery 130.

The external electronic device 101 according to embodiment may identify the first pattern information 150 and/or the second pattern information 155, by receiving the signal including the battery energy information 121 and/or the charging information 122. For example, the external electronic device 101 may identify a difference between the rated energy, which is greater than or equal to threshold energy, and the discharge energy, using the battery energy information 121. The external electronic device 101 may identify the first pattern information 150, by identifying the difference between the rated energy, which is greater than or equal to the threshold energy, and the discharge energy. The first pattern information 150 may be used to set a charging range of the battery 130, based on at least one of the rated energy of the battery 130, the discharge energy of the battery 130, the remaining energy of the battery 130, the minimum remaining energy of the battery 130, or any combination thereof.

For example, the external electronic device 101 may identify a ratio between the connection time and the charging time, using the charging information 122. If the ratio between the connection time and the charging time is greater than or equal to a threshold ratio (or a weight), the external electronic device 101 may identify the second pattern information 155. For example, the ratio between the connection time and the charging time may refer to the connection time for the charging time. The second pattern information 155 may be used to adjust a charge current, such that the charging time matches the connection time.

In an embodiment, the vehicle control apparatus 100 may obtain the first pattern information 150 and/or the second pattern information 155 from the external electronic device 101. The vehicle control apparatus 100 may update the charging profile information 123, based on the first pattern information 150 and/or the second pattern information 155. However, it is not limited thereto.

The vehicle control apparatus 100 according to embodiment may not obtain the first pattern information 150 and/or the second pattern information 155 from the external electronic device 101 but may generate pattern information (e.g., the first pattern information 150 or the second pattern information 155) for updating the charging profile information 123 using the battery energy information 121 and/or the charging information 122.

The vehicle control apparatus 100 according to embodiment may identify chargeable upper limit energy, by adding the discharge energy of the battery 130 from the minimum remaining energy of the battery 130.

For example, the vehicle control apparatus 100 may identify an SOC usage range of the battery 130, using the discharge energy. The vehicle control apparatus 100 may identify upper limit energy for charging the battery 130, by adding the SOC usage range from the minimum remaining energy. For example, the vehicle control apparatus 100 may identify an SOC usage range used on average by the battery 130, using the discharge energy.

For example, the upper limit energy may include energy corresponding to an upper limit value for charging the battery 130. The upper limit energy may be used to limit energy (or capacity) charged in the battery 130. The SOC usage range may include a value set based on the discharge energy to be calculated with a lower limit SOC corresponding to the minimum remaining energy.

For example, the vehicle control apparatus 100 may identify an upper limit SOC corresponding to the upper limit energy. The vehicle control apparatus 100 may update the charging profile information 123, based on the first pattern information 150 for setting a charging range including the lower limit SOC corresponding to the minimum remaining energy and the identified upper limit SOC. If the difference between the rated energy and the discharge energy of the battery 130 is greater than or equal to the threshold energy, the vehicle control apparatus 100 according to embodiment may update the charging profile information 123, using the first pattern information 150. When charging the battery 130 based on the updated charging profile information 123, the vehicle control apparatus 100 may charge the battery 130 to the upper limit SOC during the charging time. The upper limit SOC may be used to limit an amount of charge of the battery 130, when charging the battery 130. In other words, when charging the battery 130 based on the updated charging profile information 123, the vehicle control apparatus 100 may charge the battery 130 from a current SOC to the upper limit SOC, during the charging time. The current SOC may include an SOC of the battery 130, which is identified at a time point when the charging of the battery 130 is initiated.

The vehicle control apparatus 100 according to embodiment may determine a threshold current, based on a relationship among the rated energy of the battery 130, the connection time (e.g., a connected time between the interface and the charging connector), and the current SOC of the battery 130. The vehicle control apparatus 100 may update the charging profile information 123, using the second pattern information 155 including information about the determined threshold current. If the ratio between the connection time (e.g., the connected time between the interface and the charging connector) and the charging time is greater than or equal to the threshold ratio (or the weight), the vehicle control apparatus 100 according to an embodiment may update the charging profile information 123, using the second pattern information 155. When charging the battery 130 based on the updated charging profile information 123, the vehicle control apparatus 100 may charge the battery 130 during the connection time, by means of the charge current, which is less than or equal to the threshold current.

The vehicle control apparatus 100 may update the charging profile information 123, based on the first pattern information 150 and the second pattern information 155. When charging the battery 130 based on the updated charging profile information 123, the vehicle control apparatus 100 may identify an upper limit soc, by adding the discharge energy (or the SOC usage range corresponding to the discharge energy) from the minimum remaining energy of the battery 130. When charging the battery 130 based on the updated charging profile information 123, the vehicle control apparatus 100 may identify a threshold current determined based on a relationship among the rated energy, the connection time, and the current SOC of the battery 130. The vehicle control apparatus 100 may charge the battery 130 to the upper limit SOC during the connection time, by means of the charge current, which is less than or equal to the threshold current.

In an embodiment, when obtaining battery energy information or charging information, which corresponds to each of a plurality of vehicles, the external electronic device 101 may identify a vehicle to update charging profile information among the plurality of vehicles, using the battery energy information or the charging information corresponding to each of the plurality of vehicles. The external electronic device 101 may transmit pattern information corresponding to the vehicle to the vehicle. The external electronic device 101 may be referred to as a server in terms of managing information corresponding to each of the plurality of vehicles.

For example, the external electronic device 101 may identify a vehicle in which the difference between the rated energy and the discharge energy is greater than or equal to the threshold energy, using the battery energy information or the charging information, which corresponds to each of the plurality of vehicles. The external electronic device 101 may information identify first pattern corresponding to the identified vehicle. The external electronic device 101 may transmit the first pattern information to the identified vehicle. For example, hereinafter, the operation in which the vehicle control apparatus 100 uses the energy of the battery 130 may include an operation of using a capacity of the battery 130.

For example, the external electronic device 101 may identify a vehicle in which the ratio between the connection time and the charging time is greater than or equal to the threshold rate, using the battery energy information or the charging information, which corresponds to each of the plurality of vehicles. The external electronic device 101 may identify second pattern information corresponding to the identified vehicle. The external electronic device 101 may transmit the second pattern information to the identified vehicle.

As described above, the vehicle control apparatus 100 according to embodiment may update the charging profile information 123 for charging the battery 130, using the information (e.g., the battery energy information 121 and/or the charging information 122) about the battery 130. The vehicle control apparatus 100 may charge the battery 130 based on the updated charging profile information 123 and thus may increase an expiration date (or life) of the battery 130. The vehicle control apparatus 100 may provide a state of health (SOH) indicating the remaining life of the battery 130, which will increase by updating the charging profile information 123. Because the remaining life of the battery 130, which will increase, is predicted as the charging profile information 123 is updated, it may be referred to as hidden life.

Figure 2:
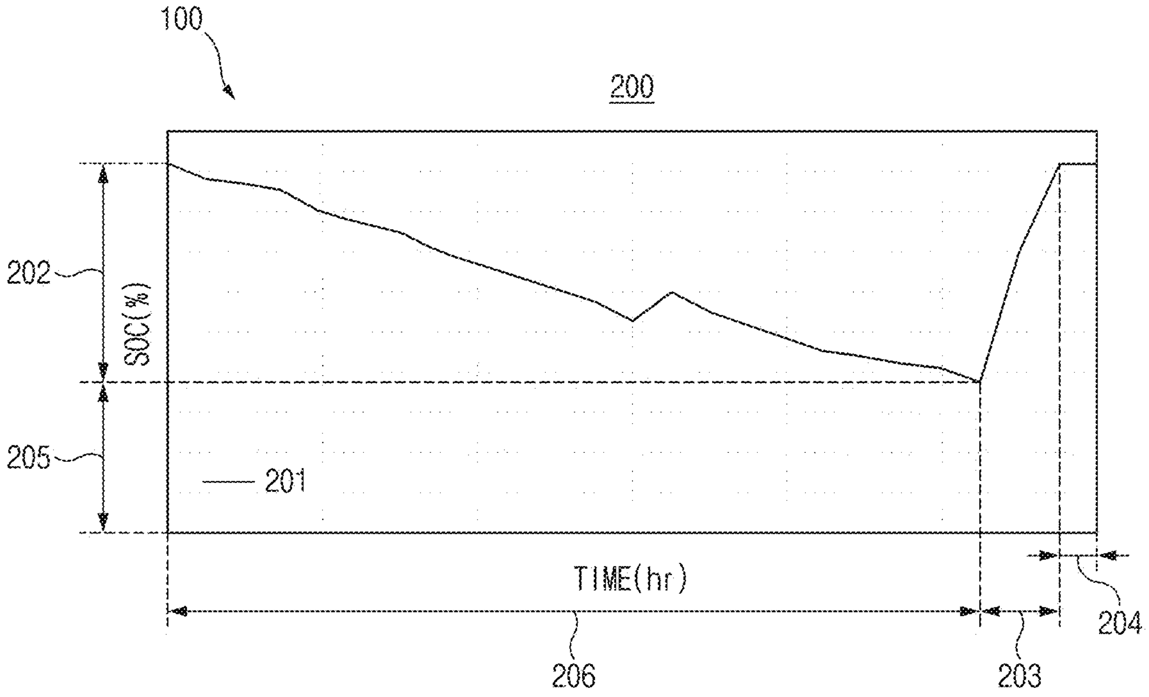
FIG. 2 illustrates an example of a graph for describing an operation of identifying a state of charge (SOC) of a battery in a vehicle control apparatus according to an embodiment of the present disclosure.
Figure 3:
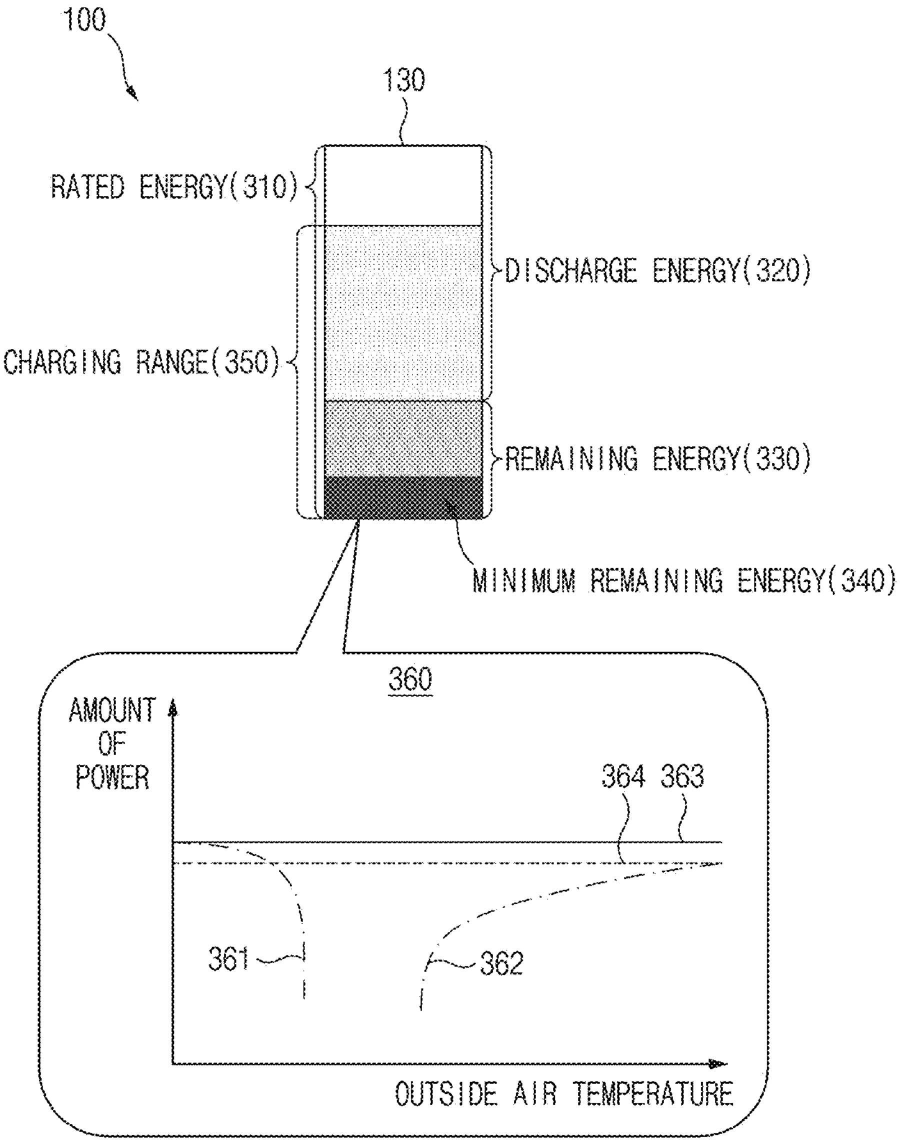
FIG. 3 illustrates an example of a state of an identified SOC in a vehicle control apparatus according to an embodiment of the present disclosure.

FIG. 2 illustrates an example of a graph for describing an operation of identifying a state of charge (SOC) of a battery in a vehicle control apparatus according to an embodiment of the present disclosure. FIG. 3 illustrates an example of a state of an identified SOC in a vehicle control apparatus according to an embodiment of the present disclosure. A vehicle control apparatus 100 of FIGS. 2 and 3 may be referred to a vehicle control apparatus 100 of FIG. 1.

Referring to FIG. 2, a graph 200 illustrating an SOC over time by using a battery (e.g., a battery 130 of FIG. 1) is illustrated. The graph 200 may include a graph 201 illustrating a transition of the SOC.

Referring to the graph 200, the vehicle control apparatus 100 according to embodiment may identify that the remaining capacity in the battery is reduced, by using the battery (or as the battery is discharged), during a usage time 206. For example, the vehicle control apparatus 100 may identify an SOC usage range 202 indicating the capacity (or energy) of the battery, which is reduced during the usage time 206. The SOC usage range 202 may correspond to discharge energy 320 of a battery 130 of FIG. 3. The vehicle control apparatus 100 may obtain the SOC usage range 202, using discharge energy. The SOC usage range 202 may include a value set based on the discharge energy to be calculated with a lower limit SOC. The SOC usage range 202 may indicate a difference between an SOC before the battery is discharged and an SOC after the battery is discharged during a usage time. For example, the vehicle control apparatus 100 may repeatedly identify the SOC usage range 202 and thus may identify an average SOC usage range according to a user of a vehicle. However, it is not limited thereto.

Referring to the graph 200, the vehicle control apparatus 100 according to embodiment may identify a remaining SOC 205, by identifying the SOC usage range 202. The SOC 205 may correspond to remaining energy 330 of the battery 130 of FIG. 3. For example, the vehicle control apparatus 100 may repeatedly identify the remaining SOC 205, thus identifying an average remaining SOC according to the user of the vehicle. However, it is not limited thereto.

Referring to FIG. 3, the vehicle control apparatus 100 according to an embodiment may identify rated energy 310 of the battery 130. The rated energy 310 may indicate a rated SOC. The rated SOC may include a value obtained by adding the SOC usage range 202 of FIG. 2 and the remaining SOC 205 of FIG. 2. The rated energy 310 may indicate a rated capacity of the battery 130.

Referring to FIG. 3, the vehicle control apparatus 100 according to an embodiment may identify minimum remaining energy 340 of the battery 130. The vehicle control apparatus 100 may use information included in a graph 360 to identify the minimum remaining energy 340. For example, the graph 360 may indicate an amount of power according to an outside air temperature.

In an embodiment, the graph 360 may include a graph 361 illustrating the usage of power according to the outside air temperature based on the use of the heater of the vehicle. The graph 360 may also include a graph 362 illustrating the usage of power according to the outside air temperature based on the use of the air conditioner of the vehicle.

Referring to the graph 361, the vehicle control apparatus 100 according to embodiment may identify a first threshold power amount 363 indicating an upper limit value (or a convergence value) of the amount of power according to the use of the heater. Referring to the graph 362, the vehicle control apparatus 100 according to embodiment may identify a second threshold power amount 364 indicating an upper limit value (or a convergence value) of the amount of power according to the use of the air conditioner.

The vehicle control apparatus 100 according to embodiment may identify minimum remaining energy 340, using the first threshold power amount 363 and/or the second threshold power amount 364. The minimum remaining energy 340 may be referred to as minimum remaining energy necessary to drive the vehicle. The minimum remaining energy 340 may correspond to a lower limit SOC necessary to drive the vehicle.

The vehicle control apparatus 100 according to embodiment may identify a charging range 350, by adding discharge energy 320 from the minimum remaining energy 340. The vehicle control apparatus 100 may add an SOC usage range corresponding to the discharge energy 320 from the lower limit SOC corresponding to the minimum remaining energy 340 and thus may identify the charging range 350. For example, the charging range 350 may include an upper limit SOC for charging the battery 130.

The vehicle control apparatus 100 according to embodiment may obtain first pattern information (e.g., first pattern information 150 of FIG. 1) for setting a charging range of the battery 130, using at least one of rated energy 310 of the battery 130, the discharge energy 320 of the battery 130, remaining energy 330 of the battery 130, the minimum remaining energy 340 of the battery 130, or any combination thereof. When charging the battery 130 using the first pattern information, the vehicle control apparatus 100 may charge the battery 130 in the set charging range. Information about the rated energy 310, the charging range 350, the discharge energy 320, the remaining energy 330, and/or the minimum remaining energy 340 may be included in battery energy information 121 and/or charging information 122 of FIG. 1.

Referring again to FIG. 2, the vehicle control apparatus 100 according to an embodiment may identify a connection between an interface for charging the battery 130 and a charging connector. The vehicle control apparatus 100 may identify a connection time when the connection is maintained. Referring to the graph 200, the connection time may refer to a time obtained by adding a charging time 203 and an idle time 204.

The vehicle control apparatus 100 according to embodiment may identify the charge current 203 taken to charge the battery 130 based on charging profile information, using a charge current received via the charging connector. The vehicle control apparatus 100 may enter a trickle charge stage or a float charge stage, after charging the battery 130 to a rated capacity of the battery 130 (or a rated SOC of the battery 130) during the charging time 203. The vehicle control apparatus 100 may maintain an SOC of the battery 130, during the idle time 204 corresponding to the trickle charge stage or the float charge stage. The idle time 204 may include a time when the connection between the charging connector and the interface is released, after the battery 130 is charged to the rated capacity of the battery 130.

The vehicle control apparatus 100 according to embodiment may obtain second pattern information for adjusting a charge current, such that the charging time 203 matches the connection time. The vehicle control apparatus 100 may determine a threshold current, based on a relationship among the rated energy 310, the connection time, and a current SOC of the battery 130. The vehicle control apparatus 100 may update the charging profile information, based on second pattern information (e.g., second pattern information 155 of FIG. 1) indicating the determined threshold current. When charging the battery 130 based on the updated charging profile information, the vehicle control apparatus 100 may charge the battery 130 during the connection time, by means of the charge current, which is less than or equal to the threshold current. The current SOC may include an SOC of the battery 130, which is identified at a time point when the charging of the battery 130 is initiated. The charging time 203, the idle time 204, and/or the connection time may be included in charging information 122 of FIG. 1.

As described above, the vehicle control apparatus 100 according to embodiment may update the charging profile information based on the first pattern information and/or the second pattern information and thus may set a voltage (or current) output from the battery 130 or transmitted to the battery 130 to be relatively low. The vehicle control apparatus 100 may set the voltage (or current) output from the battery 130 or transmitted to the battery 130 to be relatively low and thus may increase the remaining life of the battery 130.

Figure 4:
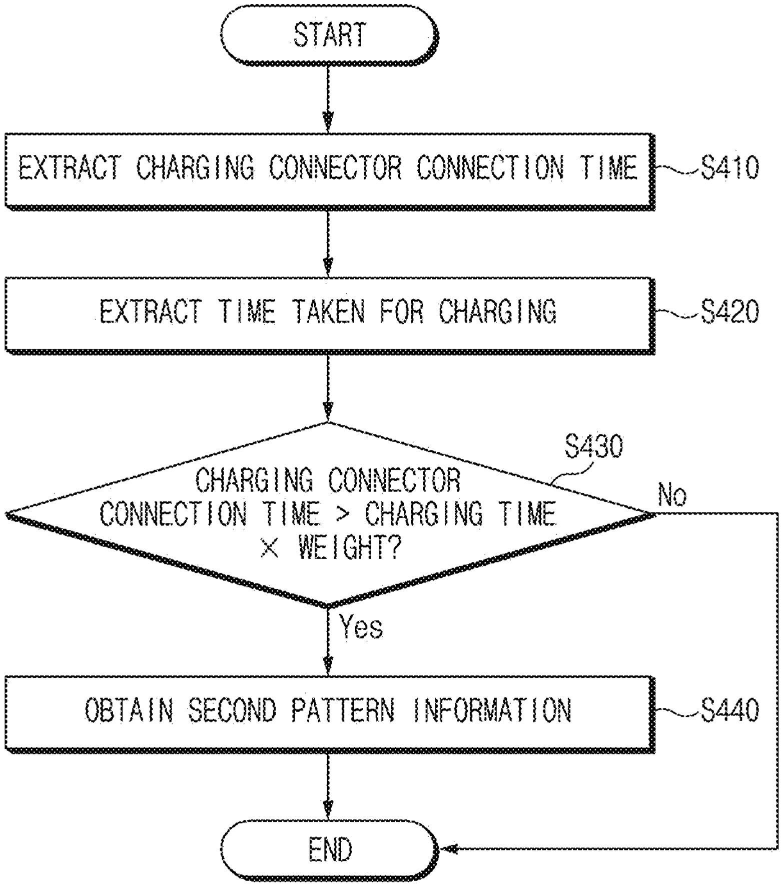
FIG. 4 illustrates an example of a flowchart indicating an operation of a vehicle control apparatus according to an embodiment of the present disclosure.

FIG. 4 illustrates an example of a flowchart indicating an operation of a vehicle control apparatus according to an embodiment of the present disclosure. Hereinafter, it is assumed that a vehicle control apparatus 100 of FIG. 1 performs a process of FIG. 4. Furthermore, in a description of FIG. 4, an operation described as being performed by a vehicle control apparatus may be understood as being controlled by a processor 110 of the vehicle control apparatus 100. The respective operations of FIG. 4 may be sequentially performed but are not necessarily sequentially performed.

For example, an order of the respective operations may be changed, and at least two operations may be performed in parallel. In an embodiment, at least one of the operations of FIG. 4 may indicate a data preprocessing operation for obtaining first pattern information. In an embodiment, at least one of the operations of FIG. 4 may be performed by a processor 110-1 of an external electronic device 101 of FIG. 1. If the external electronic device 101 of FIG. 1 performs at least one of the operations of FIG. 4, a vehicle control method may further include receiving charging information from the vehicle control apparatus 100.

Referring to S410, the vehicle control apparatus according to embodiment may extract a connection time when a battery is connected to a charging connector. The connection time may indicate a time obtained by adding a charging time 203 and an idle time 204 of FIG. 2.

Referring to S420, the vehicle control apparatus according to embodiment may extract a time taken for charging (e.g., a charging time 203 of FIG. 2). For example, the vehicle control apparatus may identify that a charge current is transmitted from the charging connector. The vehicle control apparatus may identify initiation of charging, by receiving the charge current. The vehicle control apparatus may transmit the charge current received from the charging connector to the battery and thus may charge the battery. The vehicle control apparatus may charge the battery based on charging profile information (e.g., charging profile information 123 of FIG. 1). For example, whenever charging the battery, the vehicle control apparatus may repeatedly accumulate and store information indicating the connection time and the charging time. The accumulated and stored information may be included in charging information 122 of FIG. 1.

Referring to S430, the vehicle control apparatus according to embodiment may identify whether the connection time is greater than a value obtained by multiplying the charging time by a weight (e.g., 1.5). For example, when the connection time is greater than the value obtained by multiplying the charging time by the weight (S430—Yes), in S440, the vehicle control apparatus may obtain second pattern information (e.g., second pattern information 155 of FIG. 1). When the connection time is less than or equal to the value obtained by multiplying the charging time by the weight (S430—No), the vehicle control apparatus may fail to perform the operation of obtaining the second pattern information. However, it is not limited thereto.

Figure 5:
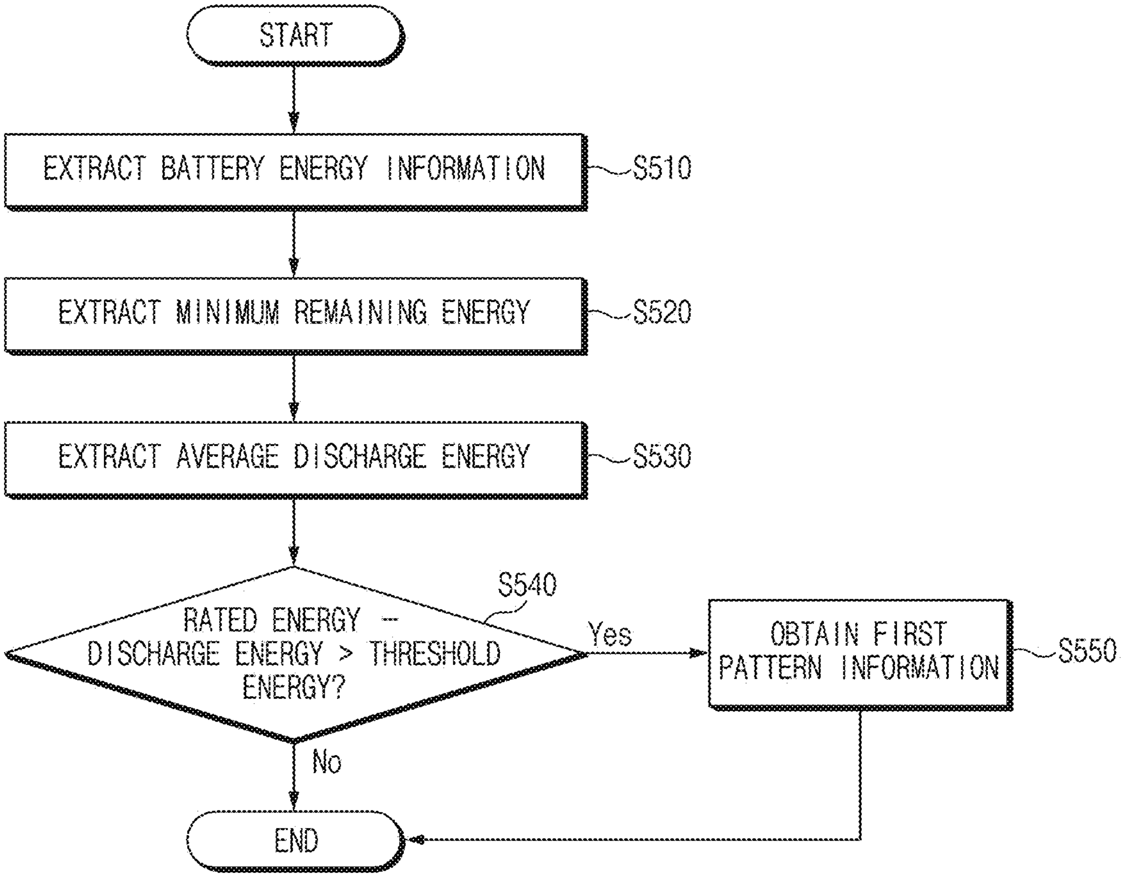
FIG. 5 illustrates an example of a flowchart indicating an operation of a vehicle control apparatus according to an embodiment of the present disclosure.

FIG. 5 illustrates an example of a flowchart indicating an operation of a vehicle control apparatus according to an embodiment of the present disclosure. Hereinafter, it is assumed that a vehicle control apparatus 100 of FIG. 1 performs a process of FIG. 5. Furthermore, in a description of FIG. 5, an operation described as being performed by a vehicle control apparatus may be understood as being controlled by a processor 110 of the vehicle control apparatus 100. The respective operations of FIG. 5 may be sequentially performed but are not necessarily sequentially performed. For example, an order of the respective operations may be changed, and at least two operations may be performed in parallel. For example, at least one of the operations of FIG. 5 may be performed in parallel with at least one of the operations of FIG. 4. For example, at least one of the operations of FIG. 5 may indicate a data preprocessing operation for obtaining second pattern information.

In an embodiment, at least one of the operations of FIG. 5 may be performed by a processor 110-1 of an external electronic device 101 of FIG. 1. If the external vehicle device 101 of FIG. 1 performs at least one of the operations of FIG. 5, a vehicle control method may further include receiving battery energy information from the vehicle control apparatus 100.

In S510, the vehicle control apparatus according to embodiment may extract the battery energy information. The battery energy information may be referred to battery energy information 121 of FIG. 1.

In S520, the vehicle control apparatus according to embodiment may extract minimum remaining energy. The minimum remaining energy may be referred to minimum remaining energy 340 of FIG. 3.

In S530, the vehicle control apparatus according to embodiment may extract average discharge energy. The average discharge energy may be included in discharge energy 320 of FIG. 3.

In S540, the vehicle control apparatus according to embodiment may identify whether a difference between rated energy and discharge energy is greater than threshold energy. For example, the vehicle control apparatus may identify whether a difference between a rated SOC and an SOC usage range is greater than a threshold SOC (e.g., about 30%). The rated SOC may correspond to rated energy. The SOC usage range may be referred to an SOC usage range 202 of FIG. 2. When the difference between the rated SOC and the SOC usage range is greater than the threshold SOC (S540—Yes), in S550, the vehicle control apparatus according to embodiment may obtain first pattern information. When the difference between the rated SOC and the SOC usage range is not greater than the threshold SOC (S540—No), the vehicle control apparatus according to embodiment may pause performing S550.

Figure 6:
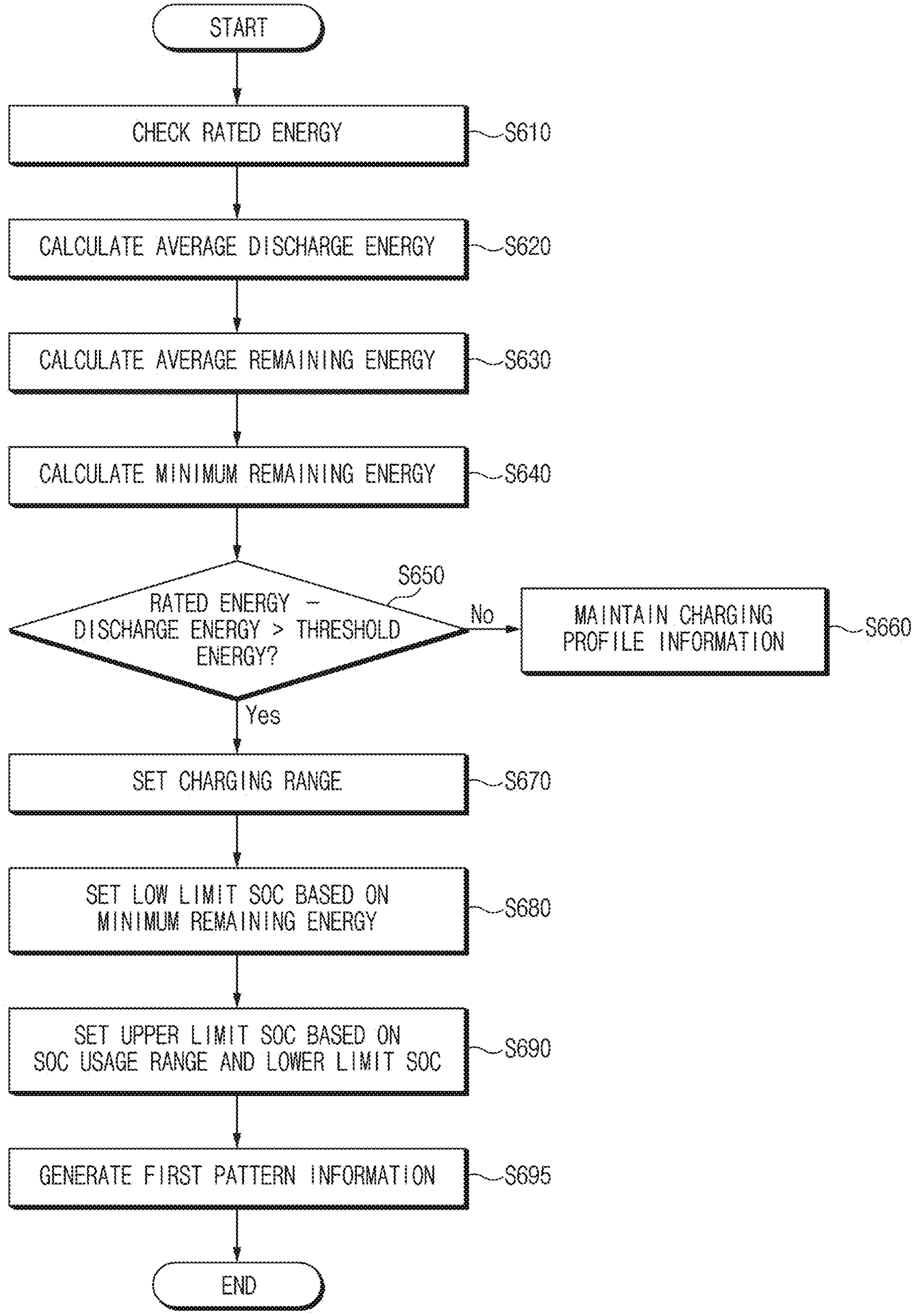
FIG. 6 illustrates an example of a flowchart indicating an operation of a vehicle control apparatus according to an embodiment of the present disclosure.

FIG. 6 illustrates an example of a flowchart indicating an operation of a vehicle control apparatus according to an embodiment of the present disclosure. Hereinafter, it is assumed that a vehicle control apparatus 100 of FIG. 1 performs a process of FIG. 6. Furthermore, in a description of FIG. 6, an operation described as being performed by a vehicle control apparatus may be understood as being controlled by a processor 110 of the vehicle control apparatus 100. The respective operations of FIG. 6 may be sequentially performed but are not necessarily sequentially performed. For example, an order of the respective operations may be changed, and at least two operations may be performed in parallel. In an embodiment, at least one of the operations of FIG. 6 may be performed by a processor 110-1 of an external electronic device 101 of FIG. 1. If the external vehicle device 101 of FIG. 1 performs at least one of the operations of FIG. 6, a vehicle control method may further include receiving battery energy information from the vehicle control apparatus 100. At least one of the operations of FIG. 6 may be associated with at least one of the operations of FIG. 5.

In S610, the vehicle control apparatus according to embodiment may check rated energy (e.g., rated energy 310 of FIG. 3) of a battery. After S510 of FIG. 5 is performed, S610 may be performed.

In S620, the vehicle control apparatus according to embodiment may calculate average discharge energy of the battery. The average discharge energy may be referred to discharge energy 320 of FIG. 3. The vehicle control apparatus may repeatedly identify discharge energy of the battery and thus calculate the average discharge energy of the battery.

In S630, the vehicle control apparatus according to embodiment may calculate average remaining energy. The average remaining energy may be referred to remaining energy 330 of FIG. 3. The vehicle control apparatus may repeatedly identify remaining energy and thus calculate the average remaining energy.

In S640, the vehicle control apparatus according to embodiment may calculate minimum remaining energy. The minimum remaining energy may be referred to minimum remaining energy 340 of FIG. 3.

In S650, the vehicle control apparatus according to embodiment may identify whether a difference between rated energy and discharge energy is greater than threshold energy. For example, the vehicle control apparatus may identify whether a difference between a rated SOC corresponding to the rated energy and an SOC usage range corresponding to the discharge energy is greater than a threshold SOC (e.g., about 30%). When the difference between the rated SOC and the SOC usage range is not greater than the threshold SOC (S650—No), in S660, the vehicle control apparatus according to embodiment may maintain charging profile information.

When the difference between the rated SOC and the SOC usage range is greater than the threshold SOC (S650—Yes), in S670, the vehicle control apparatus according to embodiment may set a charging range. The vehicle control apparatus may set the charging range of the battery, using at least one of rated energy, average discharge energy, average remaining energy, minimum remaining energy, or any combination thereof.

In S680, the vehicle control apparatus according to embodiment may set a lower limit SOC, based on the minimum remaining energy.

In S690, the vehicle control apparatus according to embodiment may set a maximum SOC (or an upper limit SOC), based on the SOC usage range and the lower limit SOC. For example, the upper limit SOC may indicate a value obtained by adding the SOC usage range corresponding to the discharge energy from the lower limit SOC. The upper limit SOC may be used to limit an amount of charge of the battery, when the battery is charged. The vehicle control apparatus may set a charging range for charging the battery to the upper limit SOC.

In S695, the vehicle control apparatus according to embodiment may generate first pattern information, based on setting the charging range. For example, the vehicle control apparatus may update the charging profile information, based on the first pattern information. When charging the battery depending on the charging profile information updated based on the first pattern information, the vehicle control apparatus may charge the battery, such that the SOC of the battery is included in the set charging range.

Figure 7A:
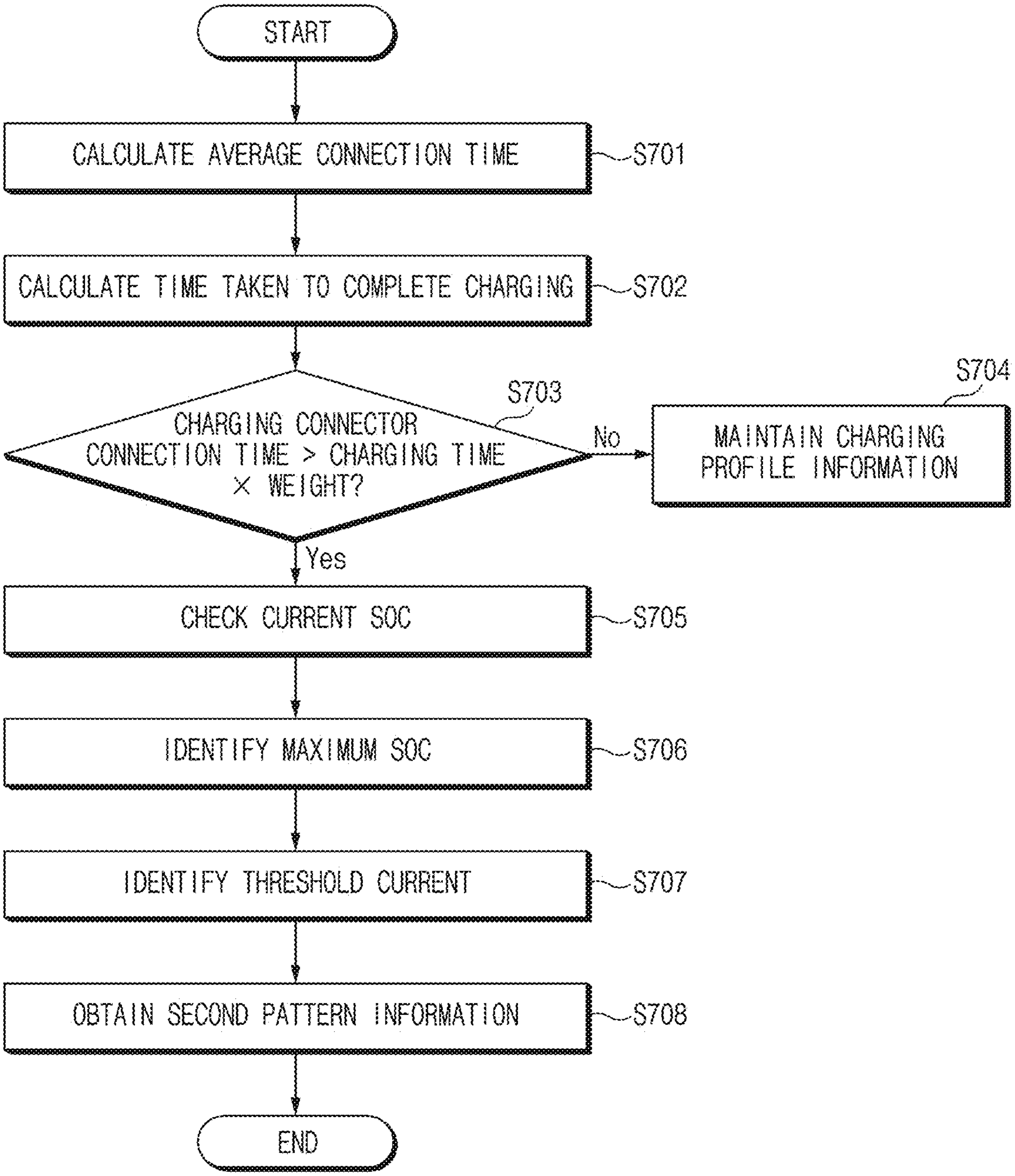
FIGS. 7A and 7B illustrate an example of a flowchart indicating an operation of a vehicle control apparatus according to an embodiment of the present disclosure.
Figure 7B:
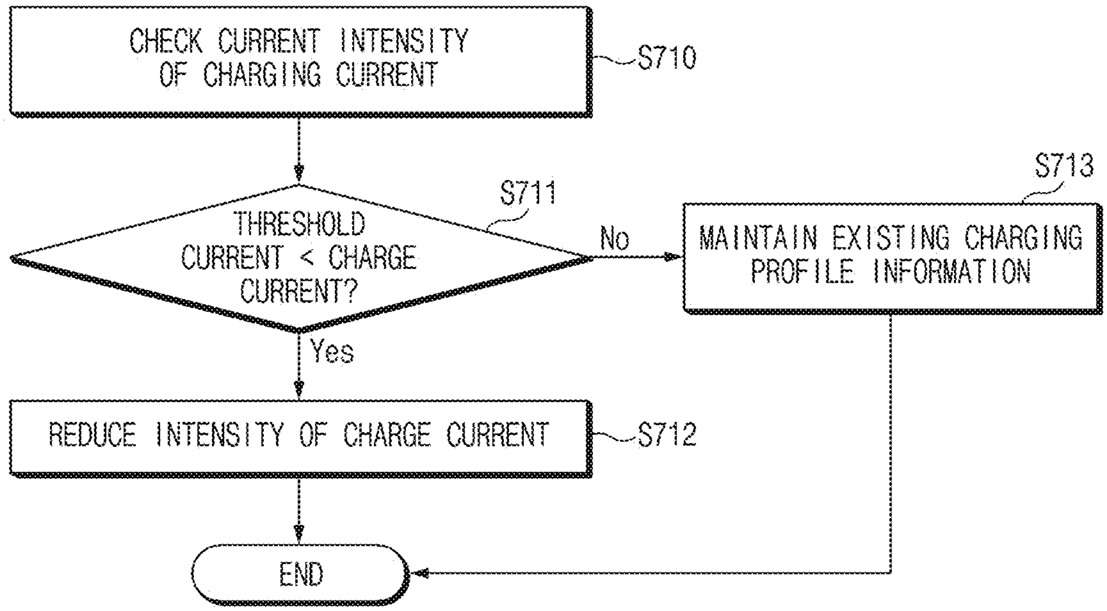

FIGS. 7A and 7B illustrate an example of a flowchart indicating an operation vehicle control apparatus according to an embodiment of the present disclosure. Hereinafter, it is assumed that a vehicle control apparatus 100 of FIG. 1 performs processes of FIGS. 7A and 7B. Furthermore, in descriptions of FIGS. 7A and 7B, an operation described as being performed by a vehicle control apparatus may be understood as being controlled by a processor 110 of the vehicle control apparatus 100. The respective operations of FIGS. 7A and 7B may be sequentially performed but are not necessarily sequentially performed. For example, an order of the respective operations may be changed, and at least two operations may be performed in parallel. At least one of the operations of FIGS. 7A and 7B may be performed by a processor 110-1 of an external electronic device 101.

Referring to FIG. 7A, in S701, the vehicle control apparatus according to an embodiment may calculate an average connection time. The vehicle control apparatus may calculate a connection time when a battery is connected to a charging connector (or a charger).

In S702, the vehicle control apparatus according to embodiment may identify a charging time indicating from a time point when the charging of the battery is initiated using the charging connector to a time point when the charging of the battery is completed. Thus, the vehicle control apparatus may calculate a time taken to complete the charging of the battery.

In S703, the vehicle control apparatus according to embodiment may identify whether a value obtained by multiplying the charging time by a weight (e.g., 1.5) is greater than the connection time. For example, when the value obtained by multiplying the charging time by the weight (e.g., 1.5) is not greater than the connection time (S703—No), in S704, the vehicle control apparatus according to an embodiment may maintain charging profile information. For example, when the value obtained by multiplying the charging time by the weight (e.g., 1.5) is greater than the connection time (S703—Yes), in S705, the vehicle control apparatus according to an embodiment may check a current SOC of the battery.

In S706, the vehicle control apparatus according to embodiment may identify a maximum SOC. The vehicle control apparatus may identify the maximum SOC, using rated energy, discharge energy, remaining energy, and/or minimum remaining energy. The maximum SOC may indicate an upper limit SOC for charging the battery. For example, the maximum SOC may correspond to the rated energy. For example, the maximum SOC may indicate a value obtained by adding an SOC usage range corresponding to the discharge energy from a lower limit SOC. However, it is not limited thereto.

In S707, the vehicle control apparatus according to embodiment may identify a threshold current. The threshold current may indicate an upper limit value of a charge current to be transmitted to the battery.

In S708, the vehicle control apparatus according to embodiment may obtain second pattern information, by identifying the threshold current. The vehicle control apparatus may update the charging profile information, using the second pattern information. When charging the battery based on the updated charging profile information, the vehicle control apparatus may adjust a charge current, based on the threshold current.

Referring to FIG. 7B, when charging the battery via the charging connector, in S710, the vehicle control apparatus according to embodiment may check current intensity of the charge current.

In S711, the vehicle control apparatus according to embodiment may identify whether the threshold current is less than the charge current. When the threshold current is greater than or equal to the charge current (S711—No), in S713, the vehicle control apparatus may maintain charging profile information. The vehicle control apparatus may maintain the charging profile information, without updating the charging profile information based on the second pattern information. Thus, the vehicle control apparatus may charge the battery based on the maintained charging profile information.

When the threshold current is less than the charge current (S711—Yes), in S712, the vehicle control apparatus according to embodiment may reduce intensity of the charge current. The vehicle control apparatus may adjust the intensity of the charge current to the threshold current or less.

Hereinafter, the operation in which the vehicle control apparatus adjusts the charge current depending on the charging profile information is described in detail with reference to FIG. 8.

Figure 8:
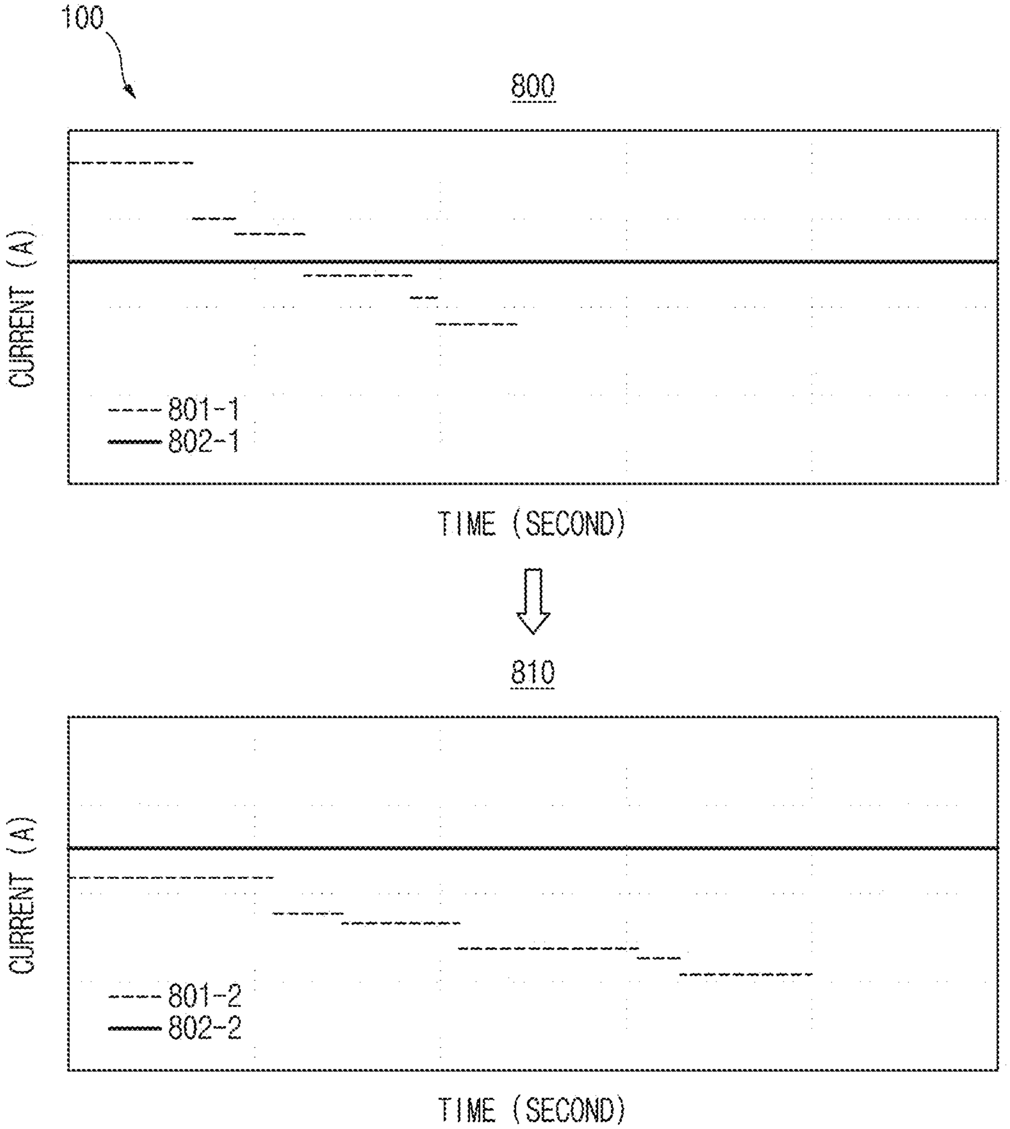
FIG. 8 illustrates an example of a graph for describing an operation of charging a battery based on second pattern information in a vehicle control apparatus according to an embodiment of the present disclosure.

FIG. 8 illustrates an example of a graph for describing an operation of charging a battery based on second pattern information in a vehicle control apparatus according to an embodiment of the present disclosure. A vehicle control apparatus 100 of FIG. 8 may be referred to a vehicle control apparatus 100 of FIG. 1. Referring to FIG. 8, graphs 800 and 810 illustrating a charge current over time are illustrated.

In an embodiment, the graph 800 may include a graph 801-1 illustrating a charge current and a graph 802-1 illustrating a threshold current. Referring to the graph 800, the vehicle control apparatus 100 according to embodiment may charge a battery based on charging profile information (e.g., charging profile information 123 of FIG. 1).

Referring to the graph 800, when charging the battery depending to charging profile information, which is not updated based on second pattern information (e.g., second pattern information 155 of FIG. 1), the vehicle control apparatus 100 according to embodiment may charge the battery, during a first charging time, based on a charge current 801-1, which is greater than the threshold current 802-1. For example, the first charging time may be shorter than a connection time when an interface for charging the battery is connected to a charging connector.

The vehicle control apparatus 100 according to an embodiment may identify a threshold current, based on Equation 1 below.

[Equation 1]

$$i = (SOC_{up} - SOC_{begin})/(t * 0.9)$$

i may indicate the threshold current. $SOC_{up}$ may indicate the rated energy or the maximum SOC (or the upper limit SOC). For example, when identifying the maximum SOC based on first pattern information, the vehicle control apparatus 100 may set $SOC_{up}$ to the maximum SOC. When not identifying the maximum SOC, the vehicle control apparatus 100 may set $SOC_{up}$ to a rated SOC corresponding to the rated energy. $SOC_{begin}$ may indicate the current SOC of the battery. t may indicate the connection time. For example, the vehicle control apparatus 100 may determine the threshold current, based on a relationship among the rated energy, the connection time, and a current SOC of the battery. 0.9 may indicate a constant for correcting a charging completion time.

If a difference between the rated energy and the discharge energy is greater than or equal to threshold energy, the vehicle control apparatus 100 according to embodiment may update the charging profile information, using the second pattern information.

Referring to the graph 810, the vehicle control apparatus 100 according to embodiment may charge the battery depending to the updated charging profile information. When charging the battery based on the updated charging profile information, the vehicle control apparatus 100 may charge the battery during a second charging time, by means of a charge current 802-2, which is less than or equal to a threshold current 801-2. The threshold current 801-2 may be referred to the threshold current 801-1.

For example, because the battery is charged by means of the charge current 802-2, which is less than or equal to the threshold current 801-2, the second charging time may be longer than the first charging time. The second charging time may correspond to a connection time when the interface for charging the battery and the charging connector are connected to each other.

As described above, the vehicle control apparatus 100 according to embodiment may charge the battery based on the charge current, which is less than or equal to the threshold current, using the entire connection time. Thus, the vehicle control apparatus 100 may prevent the life of the battery from deteriorating. The vehicle control apparatus 100 may prevent the life of the battery from deteriorating and thus may increase the remaining life of the battery.

Figure 9:
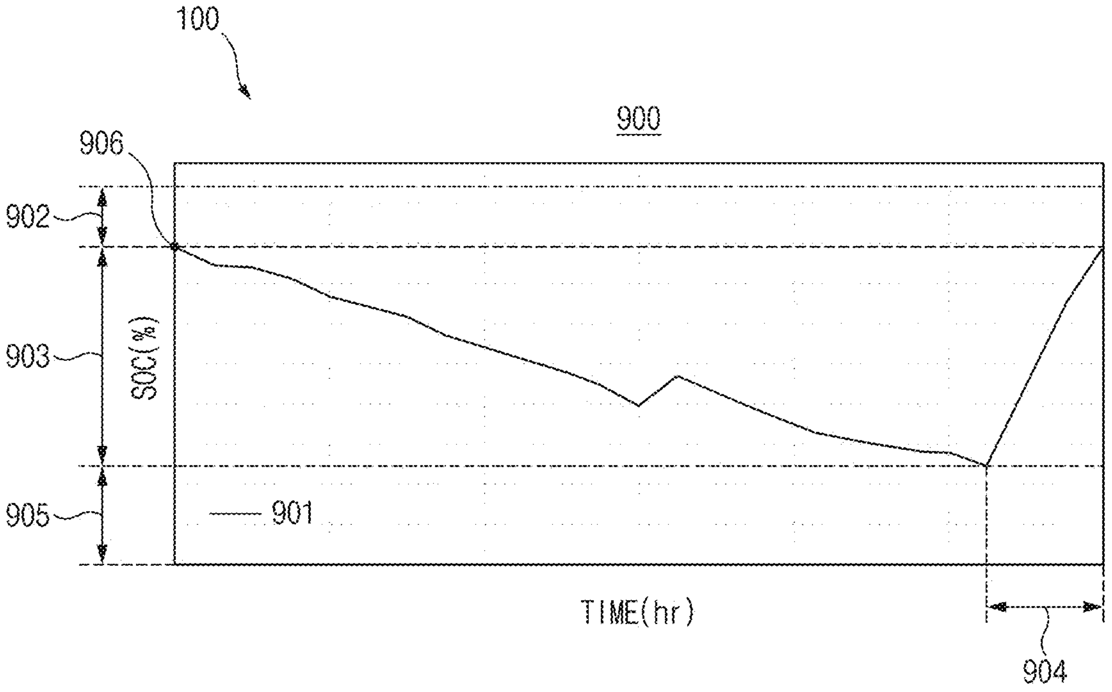
FIG. 9 illustrates an example of a graph for describing an operation of charging a battery based on first pattern information in a vehicle control apparatus according to an embodiment of the present disclosure.

FIG. 9 illustrates an example of a graph for describing an operation of charging a battery based on first pattern information in a vehicle control apparatus according to an embodiment of the present disclosure. A vehicle control apparatus 100 of FIG. 9 may be referred to a vehicle control apparatus 100 of FIG. 1. Referring to FIG. 9, in an embodiment, a graph 900 may include a graph 901 illustrating an SOC of a battery over time is illustrated.

Referring to the graph 900, discharge energy 903 may be referred to discharge energy 320 of FIG. 3. Minimum remaining energy 905 may indicate minimum remaining energy 340 of FIG. 3.

The vehicle control apparatus 100 according to embodiment may add an SOC usage range corresponding to discharge energy 903 from minimum SOC corresponding to minimum remaining energy and thus may identify maximum SOC 906 (or an upper limit SOC). Maximum energy corresponding to the maximum SOC 906 may indicate a value obtained by adding the minimum remaining energy 905 and the discharge energy 903.

For example, the vehicle control apparatus 100 may update charging profile information, based on first pattern information for setting a charging range including the minimum SOC corresponding to the minimum remaining energy and the maximum SOC. For example, a range corresponding to the discharge energy 903 may indicate a charging range. For example, when charging the battery depending on the updated charging profile information, the vehicle control apparatus 100 may charge the battery to the maximum SOC 906 during a charging time 904.

When updating the charging profile information, based on first pattern information and second pattern information, the vehicle control apparatus 100 may charge the battery to the maximum SOC 906 during a connection time by means of a charge current, which is less than or equal to a threshold current (e.g., a threshold current 801-1 of FIG. 8). The connection time may be identical to the charging time 904. The vehicle control apparatus 100 may match the connection time with the charging time 904 and thus may reduce an idle time.

As described above, when the vehicle control apparatus 100 according to embodiment uses the battery based on an SOC included in a specified range 902, deterioration in the battery may occur based on a relatively high voltage and/or a relatively high current. To prevent the battery from deteriorating, the vehicle control apparatus 100 may maintain the SOC in the charging range corresponding to energy, which is lower than the specified range 902. Thus, the vehicle control apparatus 100 may extend the life of the battery.

Figure 10:
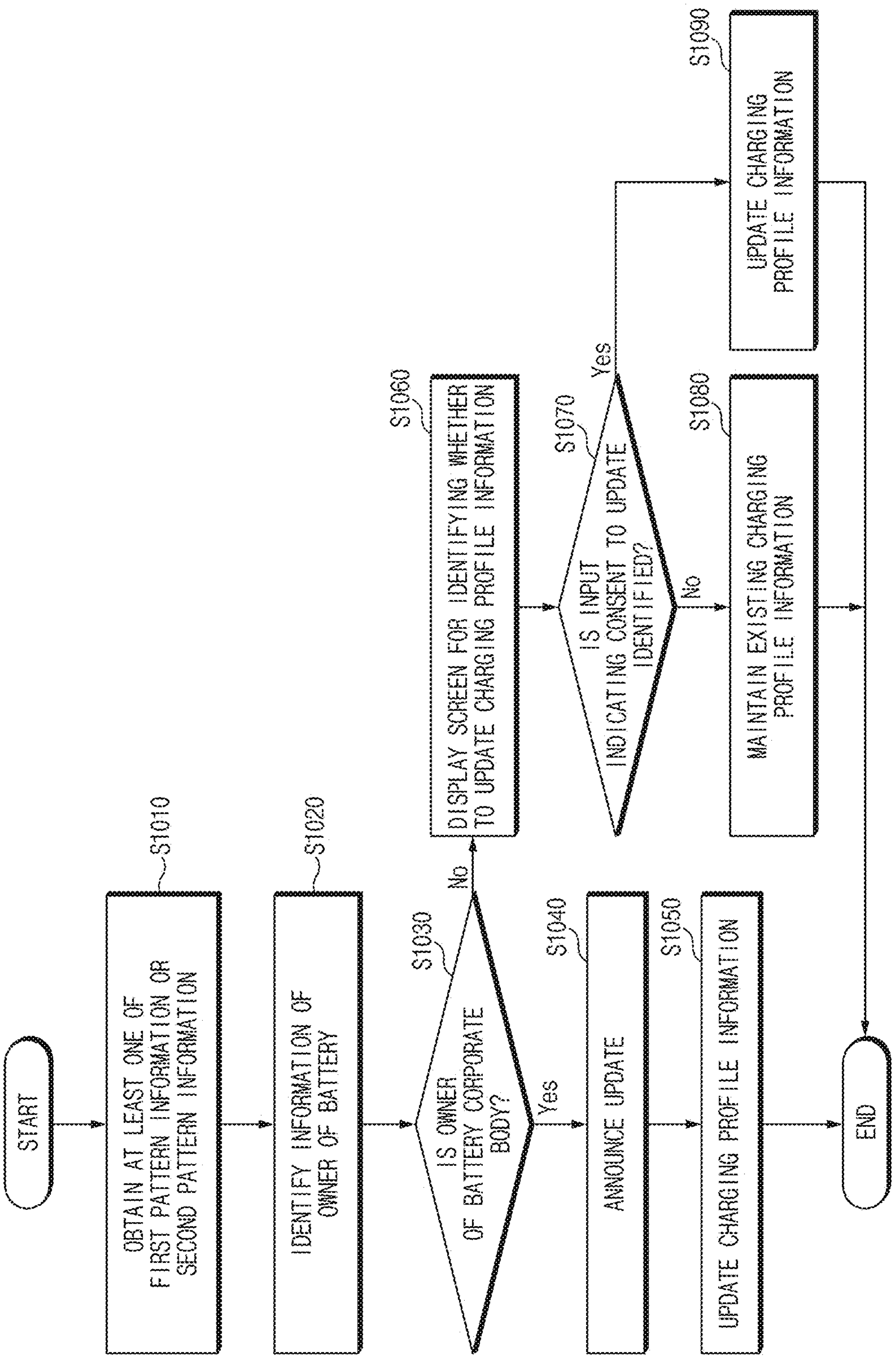
FIG. 10 illustrates an example of a flowchart vehicle control apparatus indicating an operation of a according to an embodiment of the present disclosure.

FIG. 10 illustrates an example of a flowchart indicating an operation of a vehicle control apparatus according to an embodiment of the present disclosure. Hereinafter, it is assumed that a vehicle control apparatus 100 of FIG. 1 performs a process of FIG. 10. Furthermore, in a description of FIG. 10, an operation described as being performed by a vehicle control apparatus may be understood as being controlled by a processor 110 of the vehicle control apparatus 100. The respective operations of FIG. 10 may be sequentially performed but are not necessarily sequentially performed. For example, an order of the respective operations may be changed, and at least two operations may be performed in parallel. At least one of the operations of FIG. 10 may be associated with at least one of the operations of FIGS. 6 and 7A.

Referring to FIG. 10, in S1010, the vehicle control apparatus according to an embodiment may obtain at least one of first pattern information or second pattern information. After performing at least one of S708 of FIG. 7A or S695 of FIG. 6, the vehicle control apparatus may perform S1010.

In S1020, the vehicle control apparatus according to embodiment may identify information of an owner who owns a battery. As an example, a user of the vehicle control apparatus (or a vehicle) including the battery and the owner who owns the battery may be different from each other.

In S1030, the vehicle control apparatus according to embodiment may identify whether the owner of the battery is a corporate body, using the information of the owner.

When the owner who owns the battery is an individual (S1030—No), in S1060, the vehicle control apparatus according to embodiment may display a screen for identifying whether to update charging profile information. The vehicle control apparatus may display the screen and thus may check whether to update the charging profile information, based on at least one of the first pattern information or the second pattern information.

For example, the vehicle control apparatus may display one or more visual objects (or one or more virtual objects), in the screen. The visual object may refer to an object deployable in the screen for transmission of information and/or interaction, for example, text, an image, an icon, a video, a button, a checkbox, a radio button, a text box, a slider, and/or a table. The visual object may be referred to as a visual guide, a visual object, a visual element, a UI element, a view object, and/or a view element. The vehicle control apparatus may initiate to display the visual object, using a display. An example of a screen displayed by the vehicle control apparatus is described in detail below with reference to FIG. 11.

In S1070, the vehicle control apparatus according to embodiment may check whether an input indicating consent to an update is identified. For example, when the input is identified (S1070—Yes), in S1090, the vehicle control apparatus according to embodiment may update the charging profile information. For example, when the input is not identified (S1070—No), in 1080, the vehicle control apparatus according to embodiment may maintain the existing charging profile information.

When the owner who owns the battery is the corporate body (S1030—Yes), in S1040, the vehicle control apparatus according to an embodiment may announce an update. The operation of announcing the update may include an operation of announcing information about at least one of the first pattern information or the second pattern information. For example, after updating the charging profile information, when charging the battery based on the updated charging profile information, the vehicle control apparatus may announce information about a charging time to change and/or the life of the battery, which will increase. The corporate body may include battery management company and/or a vehicle operation business (e.g., a logistics company or a corporate taxi company).

In S1050, the vehicle control apparatus according to embodiment may update the charging profile information, based on announcing the update. For example, the vehicle control apparatus may bypass displaying the screen (or the visual object) to initiate the update.

As described above, the vehicle control apparatus according to embodiment may differently perform a preprocessing operation for updating the charging profile information, by identifying the information about the owner of the battery. For example, when the owner of the battery is the individual, the vehicle control apparatus may request consent to the update and thus may protect the right of the owner of the battery. For example, when the owner of the battery is the corporate body, the vehicle control apparatus may not request the consent to the update to perform the update and thus may manage the battery used by another user differentiated from the owner of the battery.

Figure 11:
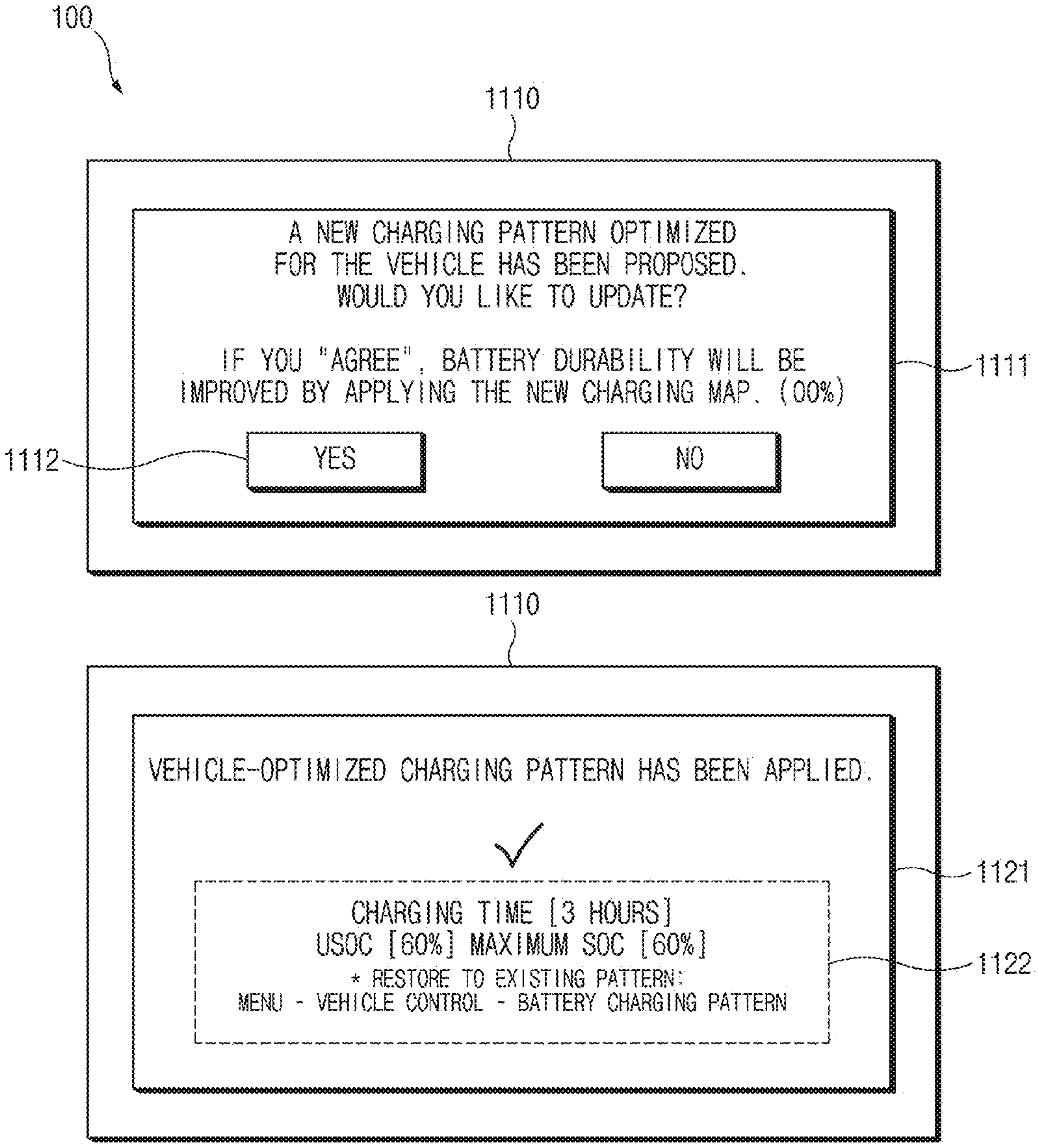
FIG. 11 illustrates an example of a screen for updating charging profile information based on pattern information in a vehicle control apparatus according to an embodiment present disclosure.

FIG. 11 illustrates an example of a screen for updating charging profile information based on pattern information in a vehicle control apparatus according to an embodiment present disclosure. A vehicle control apparatus 100 of FIG. 11 may be referred to a vehicle control apparatus 100 of FIG. 1. For example, the vehicle control apparatus 100 may further include a display 1110.

The vehicle control apparatus 100 according to embodiment may display a visual object 1111 indicating an update of charging profile information (e.g., charging profile information 123) on the display 1110 to update the charging profile information. When an owner of a battery is an individual, the vehicle control apparatus 100 may display the visual object 1111 on the display 1110. When the owner of the battery is the individual, the vehicle control apparatus 100 may display the visual object 1111 on the display 1110 to request consent to an update. The visual object 1111 may include information about extended life of the battery, which will increase, (or performance of the battery, which will be improved) after the charging profile information is updated. For example, the vehicle control apparatus 100 may provide a state of health (SOH) indicating remaining life of the battery, which will increase, by updating the charging profile information based on at least one of first pattern information or second pattern information.

According to an embodiment, the vehicle control apparatus 100 may receive an input indicating the consent to the update. For example, the vehicle control apparatus 100 may receive an input to a visual object 1112 and thus may identify the consent to the update. For example, the vehicle control apparatus 100 may initiate an update on charging profile information, in response to the input.

After updating the charging profile information, the vehicle control apparatus 100 according to embodiment may display a visual object 1121 indicating completion of the update on the display 1110. For example, the visual object 1121 may include first pattern information and/or second pattern information for updating the charging profile information. For example, the visual object 1121 may include a text object 1122 indicating a charging time, a charging range, and/or a maximum SOC. As an example, the visual object 1121 may further include a user interface for changing the charging profile information to a version before the update. The vehicle control apparatus 100 may change the charging profile information to the version before the update, using the user interface.

As described above, when the owner of the battery is the individual, the vehicle control apparatus 100 according to embodiment may display the visual object for requesting the consent to the update on the charging profile information on the display. The vehicle control apparatus 100 may request a user to consent to the update, before updating the charging profile information and thus may provide an environment capable of following a rule (or a law) associated with the battery.

Figure 12:
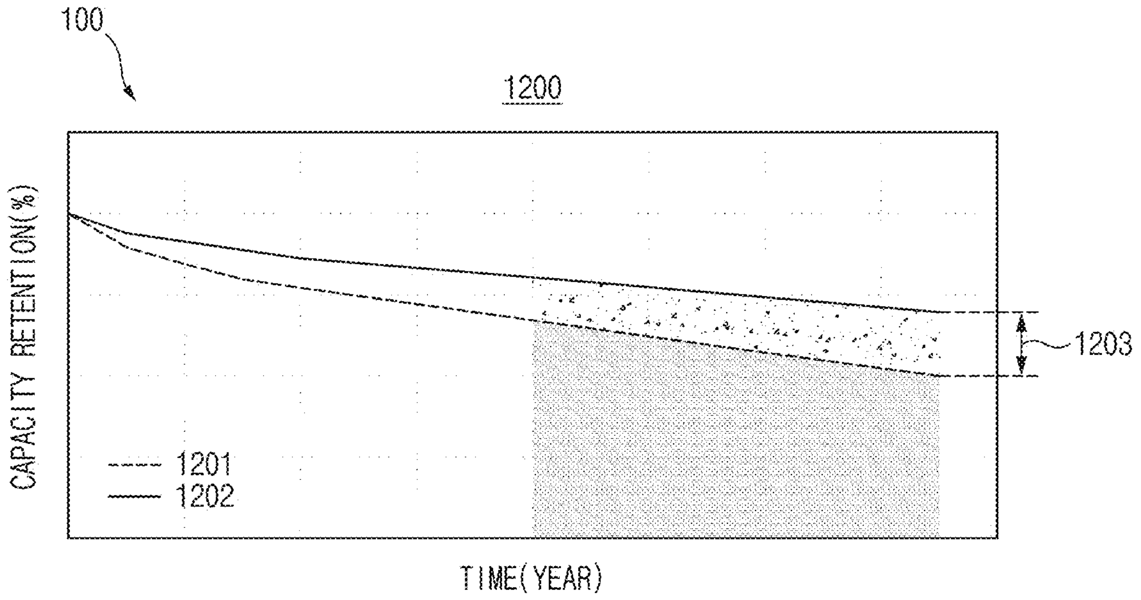
FIG. 12 illustrates an example of a graph for describing an operation of charging a battery based on updated pattern information in a vehicle control apparatus according to an embodiment of the present disclosure.

FIG. 12 illustrates an example of a graph for describing an operation of charging a battery based on updated pattern information in a vehicle control apparatus according to an embodiment of the present disclosure. In an embodiment, a graph 1200 may include a graph 1201 illustrating a maintenance rate of a battery over time, when the battery based on charging profile information with a version before an update. The graph 1200 may include a graph 1202 illustrating a maintenance rate of the battery over time, the battery is managed based on updated charging profile information.

Referring to the graph 1200, it may be seen that the maintenance rate of the battery, which is identified when the battery is managed based on the updated charging profile information, is relatively higher than the maintenance rate of the battery, which is identified when the battery is managed based on the charging profile information with the version before the update. A difference between a first value indicating at least one maintenance rate included in the graph 1202 and a second value indicating at least one maintenance rate included in the graph 1201 may include an SOH (or hidden life) 1203 indicating remaining performance (or extended life) of the battery, which will be obtained by updating the charging profile information.

After performing the updating, a vehicle control apparatus 100 according to an embodiment may provide an SOH. For example, when an owner of the battery is a corporate body, the vehicle control apparatus 100 may announce the update and thus may provide the SOH. When the owner of the battery is an individual, the vehicle control apparatus 100 may display a visual object for requesting consent to the update and thus may provide the SOH. However, it is not limited thereto.

As described above, the vehicle control apparatus 100 according to embodiment may update the charging profile information and thus may additionally ensure the value of the battery. For example, the vehicle control apparatus 100 may relatively more improve the performance of the battery than the performance of the battery, which is based on charging profile information based on the version before the update. For example, the vehicle control apparatus 100 may perform the update and thus may extend an expiration date when it is able to use the battery. For example, the vehicle control apparatus 100 may provide a user with an environment in which it is able to use the battery longer.

Figure 13:
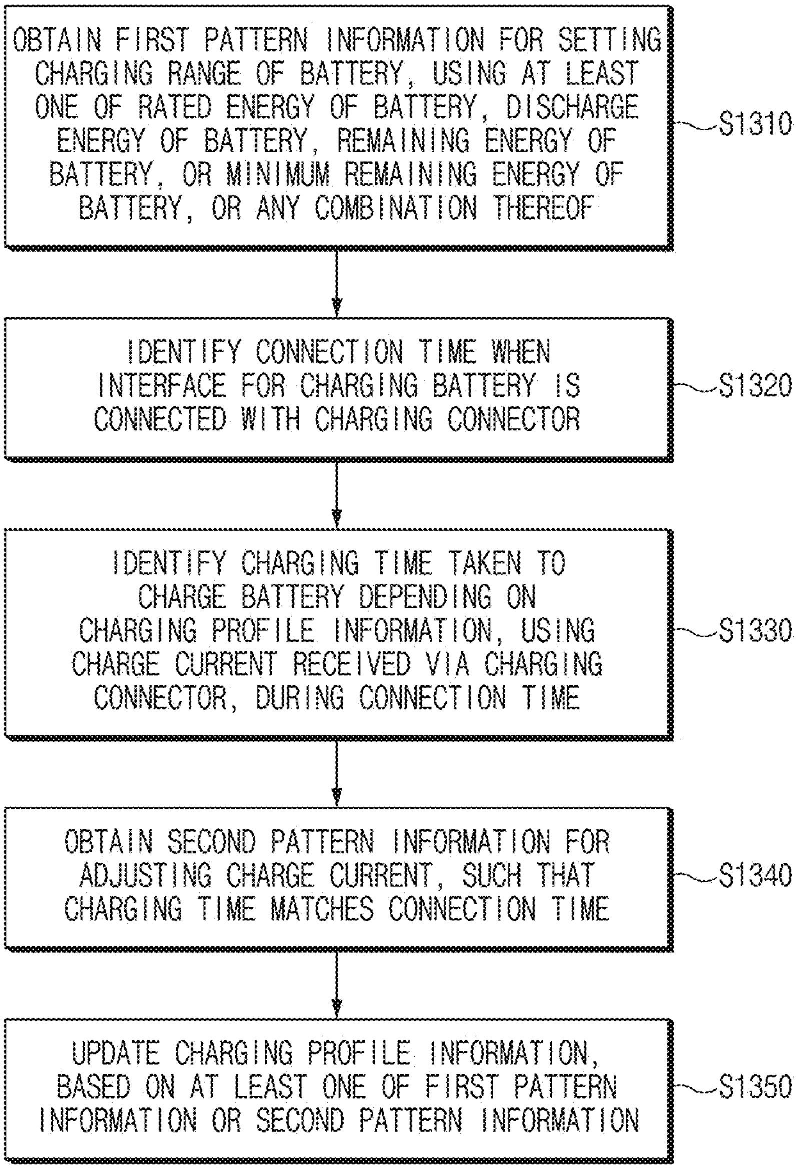
FIG. 13 illustrates an example of a flowchart indicating an operation of a vehicle control apparatus according to an embodiment of the present disclosure.

FIG. 13 illustrates an example of a flowchart indicating an operation of a vehicle control apparatus according to an embodiment of the present disclosure. Hereinafter, it is assumed that a vehicle control apparatus 100 of FIG. 1 performs a process of FIG. 13. Furthermore, in a description of FIG. 13, an operation described as being performed by an apparatus may be understood as being controlled by a processor 110 of the vehicle control apparatus 100. The respective operations of FIG. 13 may be sequentially performed but are not necessarily sequentially performed. For example, an order of the respective operations may be changed, and at least two operations may be performed in parallel.

Referring to FIG. 13, in S1310, a method performed by the vehicle control apparatus according to embodiment may include obtaining first pattern information (e.g., first pattern information 150 of FIG. 1) for setting a charging range of a battery, using at least one of rated energy of the battery, discharge energy of the battery, remaining energy of the battery, minimum remaining energy of the battery, or any combination thereof. For example, the method may include transmitting a first signal including at least one of the rated energy of the battery, the discharge energy of the battery, the remaining energy of the battery, the minimum remaining energy of the battery, or any combination thereof to an external electronic device (e.g., an external electronic device 101 of FIG. 1). For example, the method may include obtaining the first pattern information from the external electronic device. However, it is not limited thereto.

In S1320, the method performed by the vehicle control apparatus according to an embodiment may include identifying a connection time when an interface for charging the battery is connected to a charging connector.

In S1330, the method performed by the vehicle control apparatus according to embodiment may include identifying a charging time taken to charge the battery based on charging profile information, using charge current received via the charging connector, during the connection time. The connection time may include the charging time and an idle time.

In S1340, the method performed by the vehicle control apparatus according to embodiment may include obtaining second pattern information for adjusting a charge current, such that the charging time matches the connection time. For example, the method may include obtaining the second pattern information including a threshold current indicating an upper limit value of the charge current.

In S1350, the method performed by the vehicle control apparatus according to embodiment may include updating the charging profile information, based on at least one of the first pattern information or the second pattern information.

For example, the method may include updating the charging profile information using the first pattern information, if a difference between the rated energy and the discharge energy is greater than or equal to threshold energy.

In an embodiment, the method may include identifying a maximum SOC indicating maximum energy, by adding the discharge energy from the minimum remaining energy. The method may include setting a charging range including a lower limit SOC (or a minimum SOC) corresponding to the minimum remaining energy and a maximum SOC. For example, the method may include charging the battery to the maximum SOC, during the charging time, when the battery is charged based on the charging profile information updated based on the first pattern information for setting the charging range.

In an embodiment, the method may include updating the charging profile information the second pattern using information, when a ratio between the connection time and the charging time is greater than or equal to a threshold ratio (or a weight). For example, the method may include determining a threshold current based on a relationship among the rated energy, the connection time, and a current SOC of the battery. For example, the method may include charging the battery during the connection time by means of the charge current which is less than or equal to the threshold current, when charging the battery based on the charging profile information updated based on the second pattern information indicating the threshold current. When the battery is charged based on the charging profile information updated based on the second pattern information, the connection time may match the charging time.

In an embodiment, the method may include charging the battery to the maximum SOC during the connection time by means of the charge current, which is less than or equal to the threshold current, when the battery is charged on the charging profile information updated based on the first pattern information and the second pattern information.

In the method performed by the vehicle control apparatus according to embodiment, the method may include obtaining first pattern information for setting a charging range of a battery of the vehicle control apparatus, using at least one of rated energy of the battery, discharge energy of the battery, remaining energy of the battery, minimum remaining energy of the battery, or any combination thereof. The method may also include identifying connection time when an interface for charging the battery is connected with a charging connector. The method may also include identifying a charging time taken to charge the battery, based on charging profile information, using a charge current received via the charging connector, during the connection. The method may also include obtaining second pattern information for adjusting the charge current such that the charge time matches the connection time. The method may also include updating the charging profile information, based on at least one of the first pattern information or the second pattern information.

In an embodiment, the method may include identifying a maximum SOC indicating maximum energy, by adding the discharge energy from the minimum remaining energy. The method may also include charging the battery to the maximum SOC, during the charging time, when the battery is charged based on the charging profile information updated based on the first pattern information for setting the charging range including a minimum SOC corresponding to the minimum remaining energy and the identified maximum SOC.

In an embodiment, the method may include determining a threshold current based on a relationship among, the rated energy, the connection time, and a current SOC of the battery. The method may also include charging the battery during the connection time by means of the charge current, which is less than or equal to the threshold current, when the battery is charged based on the charging profile information updated based on the second pattern information indicating the determined threshold current.

In an embodiment, the method may include identifying a maximum SOC, by adding the discharge energy from the minimum remaining energy, when the battery is charged based on the charging profile information updated based on the first pattern information and the second pattern information. The method may also include charging the battery to the maximum SOC, during the connection time, by means of the charge current, which is less than or equal to the threshold current determined based on the relationship among the rated energy, the connection time, and the current SOC.

In an embodiment, the method may include displaying a visual object indicating an update of the charging profile information on a display to update the charging profile information. The method may also include receiving an input indicating consent to the update, using the visual object, and initiating the update, in response to the input.

In an embodiment, the displaying of the visual object may include identifying information of an owner who owns the battery, without displaying the visual object to initiate the update, when the owner who owns the battery is a corporate body. The displaying of the visual object may include initiating to display the visual object, when the owner who owns the battery is an individual.

In an embodiment, the updating of the charging profile information may include the updating charging profile information using the first pattern information, when the difference between the rated energy and the discharge energy is greater than or equal to the threshold energy.

In an embodiment, the updating of the charging profile information may include updating the charging profile information using the second pattern information, when the ratio between the connection time and the charging time is greater than or equal to the threshold ratio.

In an embodiment, the method may include providing a state of health (SOH) indicating remaining life of the battery, which will increase, by updating the charging profile information based on at least one of the first pattern information or the second pattern information.

In an embodiment, the method may include transmitting a first signal including at least one of the rated energy of the battery, the discharge energy of the battery, the remaining energy of the battery, the minimum remaining energy of the battery, or any combination thereof to an external electronic device. The method may also include obtaining the first pattern information from the external electronic device. The method may also include transmitting a second signal including the connection time and the charging time the external electronic device. The method may also include obtaining the second pattern information from the external electronic device.

Figure 14:
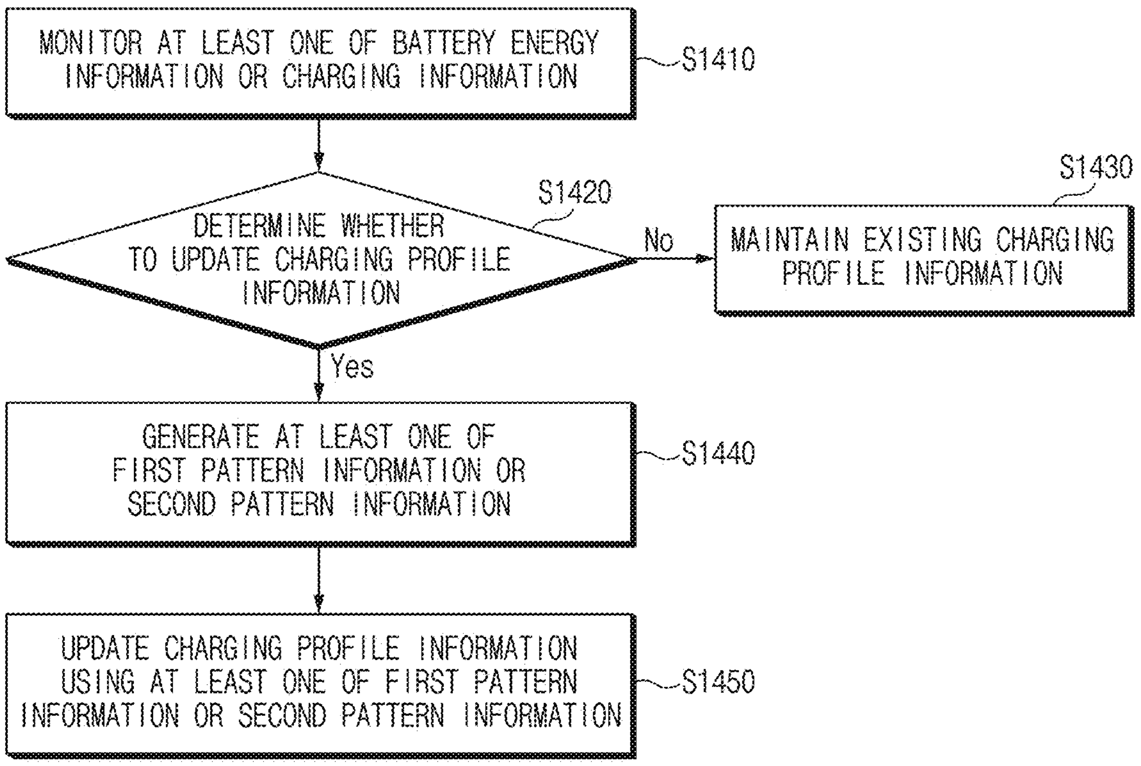
FIG. 14 illustrates an example of a flowchart indicating an operation of a vehicle control apparatus according to an embodiment of the present disclosure.

FIG. 14 illustrates an example of a flowchart indicating an operation of a vehicle control apparatus according to an embodiment of the present disclosure. Hereinafter, it is assumed that a vehicle control apparatus 100 of FIG. 1 performs a process of FIG. 14. Furthermore, in a description of FIG. 14, an operation described as being performed by an apparatus may be understood as being controlled by a processor 110 of the vehicle control apparatus 100. The respective operations of FIG. 14 may be sequentially performed but are not necessarily sequentially performed. For example, an order of the respective operations may be changed, and at least two operations may be performed in parallel.

Referring to FIG. 14, in S1410, the vehicle control method according to an embodiment may include monitoring at least one of battery energy information or charging information of a vehicle.

For example, the vehicle control method may include transmitting the battery energy information or the charging information to an external electronic device to monitor at least one of the battery energy information or the charging information of the vehicle, when a vehicle control apparatus is included in the vehicle.

For example, the vehicle control method may include receiving at least one of the battery energy information or the charging information from the vehicle to monitor the at least one of the battery energy information or the charging information, when the vehicle control apparatus is included outside the vehicle. For example, the vehicle control method may include selecting a vehicle to update charging profile information, using at least one of the battery energy information or the charging information, when the vehicle control apparatus is included outside the vehicle.

Referring to FIG. 14, in S1420, the vehicle control method according to an embodiment may include determining whether to update the charging profile information.

For example, the vehicle control method may include determining whether to update the charging profile information, by monitoring the at least one of the battery energy information or the charging information. For example, the determining of whether to update the charging profile information may include determining whether to generate at least one of first pattern information or second pattern information.

Referring to FIG. 14, when the charging profile information is not updated (S1420—No), in S1430, the vehicle control method according to an embodiment may include maintaining existing charging profile information. For example, the case in which the charging profile information is not updated may include a case in which a difference between rated energy of a battery and discharge energy of the battery is less than threshold energy. For example, the case in which the charging profile information is not updated may include a case in which a ratio between a connection time between the battery and a charging connector and a charging time taken to charge the battery is less than a threshold ratio.

For example, the case in which the vehicle control apparatus does not update the charging profile information may include a case in which pattern information is not generated.

For example, the case in which the charging profile information is updated may include a case in which the difference between the rated energy of the battery and the discharge energy of the battery is greater than the threshold energy. The case in which the charging profile information is updated may include a case in which the ratio between the connection time between the battery and the charging connector and the charging time taken to charge the battery is greater than or equal to the threshold ratio.

For example, the case in which the charging profile information is updated may a include case in which determination to generate at least one of the first pattern information or the second pattern information is performed.

Referring to FIG. 14, when the charging profile information is updated (S1420—Yes), in S1440, the vehicle control method according to an embodiment may include generating at least one of the first pattern information or the second pattern information. For example, the vehicle control method may include generating the first pattern information, when the difference between the rated energy of the battery and the discharge energy of the battery is greater than or equal to the threshold energy.

For example, the vehicle control method may include generating the second pattern information, when the ratio between the connection time when the battery is connected to the charging connector to charge the battery and the charging time taken to charge the battery is greater than or equal to the threshold ratio.

For example, the vehicle control method may include determining to update the charging profile information to generate at least one of the first pattern information or the second pattern information.

For example, the vehicle control method may include receiving an input indicating consent to updating the first pattern information and/or the second pattern information in the charging profile information, by generating the first pattern information and/or the second pattern information.

Referring to FIG. 14, in S1450, the vehicle control method according to an embodiment may include updating the charging profile information using at least one of the first pattern information or the second pattern information.

For example, the vehicle control method may include identifying minimum remaining energy of the battery and discharge energy of the battery using the battery energy information. The vehicle control method may include setting a charging range including an upper limit SOC obtained by adding an SOC usage range corresponding to the discharge energy of the battery from a lower limit SOC corresponding to the minimum remaining energy of the battery, using the minimum remaining energy and the discharge energy. The vehicle control method may include updating the charging profile information based on the first pattern information indicating the charging range. The vehicle control method may include charging the battery to the upper limit SOC, during the charging time between the connection time and the charging time, when the battery is charged based on the updated charging profile information.

For example, the vehicle control method may include determining a threshold current based on a relationship among the rated energy of the battery, which is identified using the charging information, the connection time when the battery is connected to the charging connector to charge the battery, and/or the current SOC of the battery. The vehicle control method may include charging the battery during the connection time by means of the charge current which is less than or equal to the threshold current, when the battery is charged based on the charging profile information updated based on the second pattern information indicating the threshold current. For example, when the battery of the vehicle is charged based on the charging profile information updated based on the second pattern information, the connection time may match the charging time.

For example, the vehicle control method may include identifying an upper limit SOC, based on the minimum remaining energy identified using the battery energy information and the discharge energy, when the battery is charged based on the charging profile information updated based on the first pattern information and the second pattern information. The vehicle control method may include charging the battery to the upper limit SOC, during the connection time between the charging time and the connection time, by means of the charge current, which is less than or equal to the threshold current determined based on a relationship among the rated energy of the battery, the connection time when the battery is connected to the charging connector to charge the battery, and the current SOC.

The present disclosure may set a charging range of the battery.

The present disclosure may adjust a charge current for charging the battery.

Furthermore, the present disclosure may identify whether to update charging profile information depending on an owner of the battery.

In addition, various effects ascertained directly or indirectly through the present disclosure may be provided.

Hereinabove, although the present disclosure has been described with reference to embodiments and the accompanying drawings, the present disclosure is not limited thereto. The present disclosure may be variously modified and altered by those having ordinary skill in the art to which the present disclosure pertains without departing from the spirit and scope of the present disclosure claimed in the following claims.

Therefore, embodiments of the present disclosure are not intended to limit the technical spirit of the present disclosure but provided only for the illustrative purpose. The scope of the present disclosure should be construed based on the accompanying claims, and all the technical ideas within the scope equivalent to the claims should be included in the scope of the present disclosure.

What is claimed is:

1. A vehicle control apparatus, comprising:

a processor; and a memory, wherein the processor is configured to monitor at least one of battery energy information or charging information of a vehicle, determine whether to generate at least one of first pattern information for setting a charging range of a battery of the vehicle or second pattern information for adjusting a charge current using a charging time taken to charge the battery, by monitoring the at least one of the battery energy information or the charging information, identify an input indicating consent to updating the at least one of the first pattern information or the second pattern information, wherein the at least one of the first pattern information or the second pattern information is generated based on determination to generate the at least one of the first pattern information or the second pattern information, in charging profile information, and update the charging profile information, using the generated at least one of the first pattern information or the second pattern information, in response to the identified input.

2. The vehicle control apparatus of claim 1, wherein the processor is configured to:

identify minimum remaining energy of the battery and discharge energy of the battery, using the battery energy information;

set the charging range including an upper limit state of charge (SOC) in which an SOC usage range corresponding to the discharge energy of the battery is added from a lower limit SOC corresponding to the minimum remaining energy of the battery, using the minimum remaining energy and the discharge energy; and charge the battery to the upper limit SOC, during the charging time, when the battery is charged based on the charging profile information updated based on the first pattern information indicating the charging range.

3. The vehicle control apparatus of claim 1, wherein the processor is configured to:

determine a threshold current, such that a connection time when the battery is connected to a charging connector to charge the battery and the charging time match with each other, based on a relationship among rated energy of the battery, wherein the rated energy is identified using the charging information, the connection time, and a current SOC of the battery; and charge the battery during the connection time by means of the charge current, wherein the charge current is less than or equal to the threshold current, when the battery is charged based on the charging profile information, wherein the charging profile information is updated based on the second pattern information indicating the determined threshold current.

4. The vehicle control apparatus of claim 1, wherein the processor is configured to:

identify an upper limit SOC, based on minimum remaining energy and discharge energy identified using the battery energy information, when the battery is charged based on the charging profile information, wherein the charging profile information is updated based on the first pattern information and the second pattern information; and charge the battery to the upper limit SOC, during a connection time when the battery is connected to a charging connector to charge the battery, by the charge current, wherein the charge current is less than or equal to a threshold current determined based on a relationship among rated energy of the battery, the connection time, and a current SOC.

5. The vehicle control apparatus of claim 1, further comprising:

a display, wherein the processor is configured to display a visual object indicating an update of the charging profile information on the display to update the charging profile information, when the processor and the memory are included in the vehicle, receive the input indicating the consent to the update, using the visual object, and initiate the update, in response to the input.

6. The vehicle control apparatus of claim 5, wherein the processor is configured to:

identify information of an owner who owns the battery;

without displaying the visual object, initiate the update, when the owner who owns the battery is a corporate body; and initiate to display the visual object, when the owner who owns the battery is an individual.

7. The vehicle control apparatus of claim 1, wherein the processor is configured to:

generate the first pattern information, when a difference between rated energy of the battery and discharge energy of the battery is greater than or equal to threshold energy.

8. The vehicle control apparatus of claim 1, wherein the processor is configured to:

generate the second pattern information, when a ratio between a connection time between the battery and a charging connector and the charging time is greater than or equal to a threshold ratio.

9. The vehicle control apparatus of claim 1, wherein the processor is configured to:

provide a state of health (SOH) indicating remaining life of the battery, the remaining life to increase, by updating the charging profile information using the at least one of the first pattern information or the second pattern information.

10. The vehicle control apparatus of claim 1, wherein the processor is configured to:

transmit a first signal including at least one of rated energy of the battery, discharge energy of the battery, remaining energy of the battery, minimum remaining energy of the battery, or any combination thereof to an external electronic device, when the processor and the memory are included in the vehicle;

obtain the first pattern information from the external electronic device;

transmit a second signal including a connection time between the battery and a charging connector and the charging time to the external electronic device; and obtain the second pattern information from the external electronic device.

11. The vehicle control apparatus of claim 1, wherein the processor is configured to:

receive at least one of the battery energy information or the charging information corresponding to each of a plurality of vehicles including the vehicle from the plurality of vehicles, when the processor and the memory are included outside the vehicle; and generate at least one of the first pattern information or the second pattern information corresponding to the vehicle among the plurality of vehicles, by monitoring the received at least one of the battery energy information or the charging information.

12. A method, comprising:

monitoring at least one of battery energy information or charging information of a vehicle;

determining whether to generate at least one of first pattern information for setting a charging range of a battery of the vehicle or second pattern information for adjusting a charge current using a charging time taken to charge the battery, by monitoring the at least one of the battery energy information or the charging information;

identifying an input indicating consent to updating the at least one of the first pattern information or the second pattern information, wherein the at least one of the first pattern information or the second pattern information is generated based on determination to generate the at least one of the first pattern information or the second pattern information, in charging profile information; and updating the charging profile information, using the generated at least one of the first pattern information or the second pattern information, in response to the identified input.

13. The method of claim 12, wherein updating the charging profile information includes:

identifying minimum remaining energy of the battery and discharge energy of the battery, using the battery energy information;

setting the charging range including an upper limit state of charge (SOC) in which an SOC usage range corresponding to the discharge energy of the battery is added from a lower limit SOC corresponding to the minimum remaining energy of the battery, using the minimum remaining energy and the discharge energy; and charging the battery to the upper limit SOC, during the charging time, when the battery is charged based on the charging profile information updated based on the first pattern information indicating the charging range.

14. The method of claim 12, wherein updating the charging profile information includes:

determining a threshold current, such that a connection time when the battery is connected to a charging connector to charge the battery and the charging time match with each other, based on a relationship among rated energy of the battery, wherein the rated energy is identified using the charging information, the connection time, and a current SOC of the battery; and charging the battery during the connection time by the charge current, wherein the charge current is less than or equal to the threshold current, when the battery is charged based on the charging profile information, wherein the charging profile information is updated based on the second pattern information indicating the determined threshold current.

15. The method of claim 12, wherein updating the charging profile information includes:

identifying an upper limit SOC, based on minimum remaining energy and discharge energy identified using the battery energy information, when the battery is charged based on the charging profile information, wherein the charging profile information is updated based on the first pattern information and the second pattern information; and charging the battery to the upper limit SOC, during a connection time when the battery is connected to a charging connector to charge the battery, by the charge current, wherein the charge current is less than or equal to a threshold current determined based on a relationship among rated energy of the battery, the connection time, and a current SOC.

16. The method of claim 12, wherein identifying the input includes:

displaying a visual object indicating an update of the charging profile information on a display to update the charging profile information; and receiving the input indicating the consent to the update, using the visual object.

17. The method of claim 16, wherein displaying the visual object includes:

identifying information of an owner who owns the battery;

without displaying the visual object, initiating the update, when the owner who owns the battery is a corporate body; and initiating to display the visual object, when the owner who owns the battery is an individual.

18. The method of claim 12, wherein determining whether to generate the at least one of the first pattern information or the second pattern information includes:

generating the first pattern information, when a difference between rated energy of the battery and discharge energy of the battery is greater than or equal to threshold energy.

19. The method of claim 12, wherein determining whether to generate the at least one of the first pattern information or the second pattern information includes:

generating the second pattern information, when a ratio between a connection time between the battery and a charging connector and the charging time is greater than or equal to a threshold ratio.

20. The method of claim 12, wherein updating the charging profile information includes:

providing a state of health (SOH) indicating remaining life of the battery, the remaining life to increase, by updating the charging profile information using the at least one of the first pattern information or the second pattern information.

* * * * *